United States Patent
Thakare et al.

(10) Patent No.: US 12,200,067 B1
(45) Date of Patent: Jan. 14, 2025

(54) SESSION-BASED DEVICE GROUPING

(71) Applicant: Amazon Technologies, Inc., Seattle, WA (US)

(72) Inventors: Prashant Jayaram Thakare, Sammamish, WA (US); Nicholas Adam Cummings, Lynnwood, WA (US); Ratika Anand, San Jose, CA (US); Faqin Zhong, Mountain View, CA (US); Parathan Sivagnanasundaram, San Jose, CA (US); Casey Stuart Smith, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/103,748

(22) Filed: Jan. 31, 2023

Related U.S. Application Data

(63) Continuation of application No. 17/473,394, filed on Sep. 13, 2021, now Pat. No. 11,575,758.

(51) Int. Cl.
*H04L 67/141* (2022.01)
*G06F 3/16* (2006.01)

(52) U.S. Cl.
CPC ............ *H04L 67/141* (2013.01); *G06F 3/165* (2013.01); *H04R 2227/005* (2013.01)

(58) Field of Classification Search
CPC ...................................................... G06F 3/165
See application file for complete search history.

(56) References Cited

U.S. PATENT DOCUMENTS

| | | |
|---|---|---|
| 9,431,021 B1 | 8/2016 | Scalise et al. |
| 9,916,839 B1 * | 3/2018 | Scalise .................. G10L 15/22 |
| 10,157,042 B1 | 12/2018 | Jayakumar et al. |
| 10,157,242 B2 | 12/2018 | Fukubayashi |
| 10,466,962 B2 | 11/2019 | Wilberding et al. |
| 10,853,031 B2 | 12/2020 | Jayakumar et al. |

(Continued)

FOREIGN PATENT DOCUMENTS

WO    2019156982 A1    8/2019

OTHER PUBLICATIONS

U.S. Appl. No. 17/473,394, "Notice of Allowance," Mailed Sep. 28, 2022, 9 pages.

(Continued)

*Primary Examiner* — Asher D Kells
(74) *Attorney, Agent, or Firm* — Kilpatrick Townsend & Stockton LLP

(57) ABSTRACT

Techniques for session-based device grouping are described. In an example, a computer system receives first data requesting an output, determines a function to provide content data based at least in part on the first data, determines a session identifier of a session associated with execution of the function, and determines session data associated with the session identifier. The session data includes a first device identifier of a first device, an indication that the first device is outputting the content data, and a second device identifier of a second device. The computer system also causes, based at least in part on the session data including the second device identifier, the second device to output the content data.

20 Claims, 16 Drawing Sheets

(56) References Cited

U.S. PATENT DOCUMENTS

| | | | |
|---|---|---|---|
| 2015/0382050 A1* | 12/2015 | Le Nerriec | H04N 21/43076 |
| | | | 725/80 |
| 2016/0212178 A1* | 7/2016 | Zhang | H04L 65/403 |
| 2017/0025124 A1 | 1/2017 | Mixter et al. | |
| 2017/0236512 A1* | 8/2017 | Williams | G06F 40/40 |
| | | | 381/79 |
| 2017/0242653 A1 | 8/2017 | Lang et al. | |
| 2017/0243576 A1 | 8/2017 | Millington et al. | |
| 2017/0243653 A1 | 8/2017 | Missiroli | |
| 2017/0279426 A1* | 9/2017 | Dizon | H03G 1/02 |
| 2018/0004372 A1 | 1/2018 | Zurek et al. | |
| 2018/0018967 A1 | 1/2018 | Lang et al. | |
| 2018/0097654 A1* | 4/2018 | Suyama | H04L 12/2812 |
| 2018/0107446 A1* | 4/2018 | Wilberding | G06F 3/165 |
| 2018/0233137 A1* | 8/2018 | Torok | G06F 3/167 |
| 2019/0102145 A1 | 4/2019 | Wilberding et al. | |
| 2019/0124159 A1* | 4/2019 | Alsina | H04N 21/6125 |
| 2019/0243606 A1* | 8/2019 | Jayakumar | G06F 3/167 |
| 2020/0401365 A1 | 12/2020 | Wilberding et al. | |
| 2021/0044855 A1* | 2/2021 | de Boursetty | H04N 21/234 |
| 2021/0109706 A1 | 4/2021 | Jayakumar et al. | |
| 2022/0116438 A1* | 4/2022 | Bradley | H04W 12/037 |
| 2022/0394071 A1* | 12/2022 | Nehlin | H04L 65/1069 |
| 2023/0421955 A1* | 12/2023 | Torok | H04R 27/00 |

OTHER PUBLICATIONS

U.S. Appl. No. 15/889,754, "Notice of Allowance," Mailed Aug. 14, 2018, 12 pages.

U.S. Appl. No. 16/222,751, "Non Final Office Action," Mailed Aug. 1, 2019, 12 pages.

U.S. Appl. No. 16/222,751, "Final Office Action," Mailed Dec. 13, 2019, 12 pages.

U.S. Appl. No. 16/222,751, "Ex Parte Quayle Action," Mailed Apr. 6, 2020, 5 pages.

U.S. Appl. No. 16/222,751, "Notice of Allowance," Mailed Jul. 27, 2020, 6 pages.

U.S. Appl. No. 17/107,156, "Non-Final Office Action," Mailed Apr. 29, 2021, 15 pages.

* cited by examiner

SESSION-BASED DEVICE GROUPING

CROSS-REFERENCE TO RELATED APPLICATION

This application claims priority to and is a continuation of U.S. patent application Ser. No. 17/473,394, filed Sep. 13, 2021, issued to U.S. Pat. No. 11,575,758 on Feb. 7, 2023, and entitled "SESSION-BASED DEVICE GROUPING," the content of which is hereby incorporated by reference in its entirety for all purposes.

BACKGROUND

Different modalities are available to control devices. An example modality is visual and relies on graphical user interfaces. Another example modality is vocal and relies on a voice user interface. Voice-based modality can employ what is referred to as near-field voice recognition, in which a user speaks into a microphone located on a hand held device, such as a mobile device. Other voice-based modality systems employ far-field voice recognition, in which a user can speak to a device while the user is within the general vicinity of the device, e.g., within the same room, but not necessarily in close proximity to or even facing the device. Systems can implement one or both modalities. Such systems can support audio and video functionalities.

BRIEF DESCRIPTION OF THE DRAWINGS

Various embodiments in accordance with the present disclosure will be described with reference to the drawings, in which.

DETAILED DESCRIPTION

Figure 1:
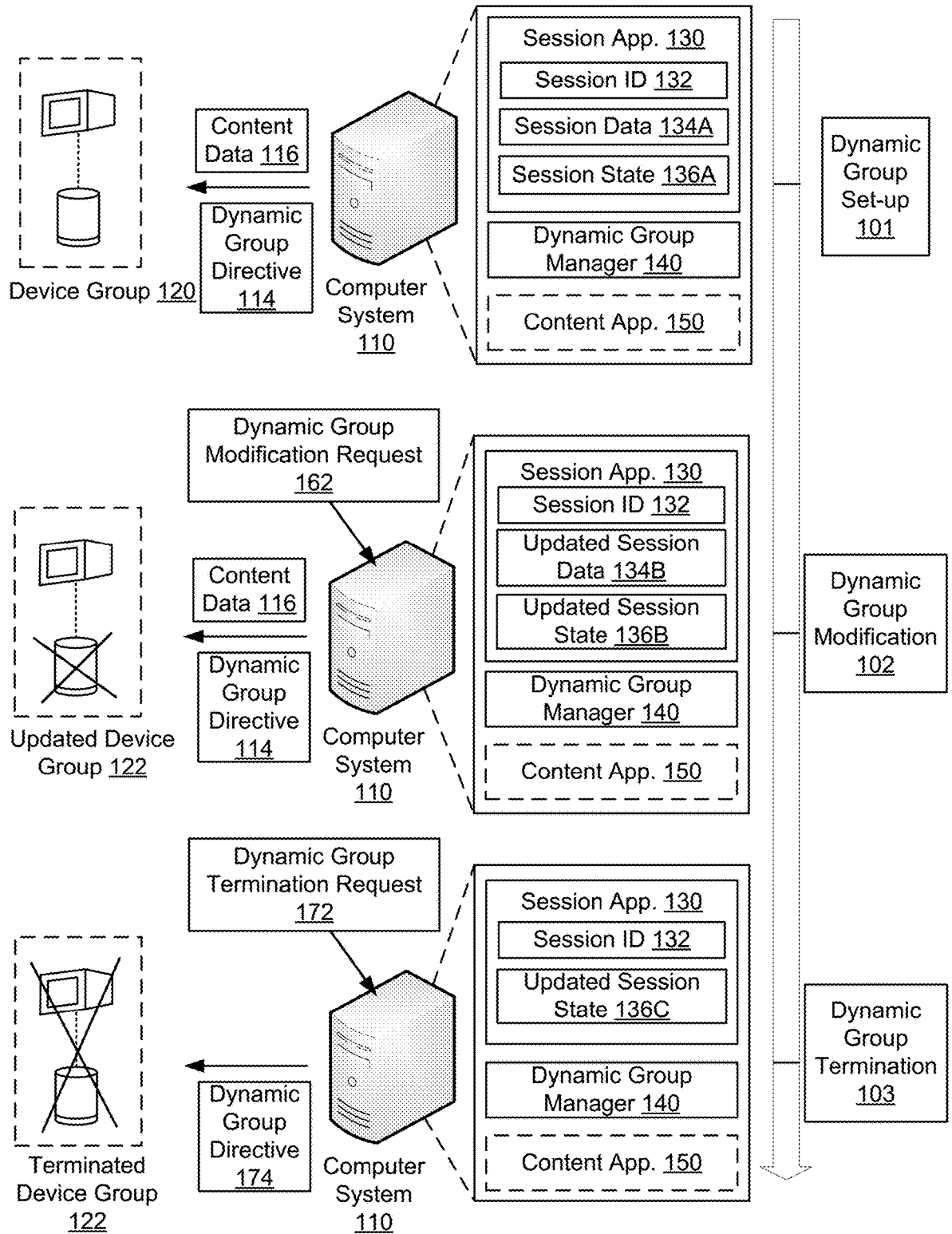
FIG. 1 illustrates an example of session-based grouping of devices, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, dynamically grouping devices based on a session-based approach. In an example, devices can be dynamically grouped to support a particular function that provides a user experience, such as outputting content (e.g., audio content for music playback) together. The function can represent at least one action that is defined using program code of an application. A session starts when the function is executed and ends when the execution terminates. The output of the function's execution can be provided to a group of devices. Each device of the group can present the output depending on a state of the device. A session identifier and session data are used to store information about the session over time. The session identifier can uniquely identify the session. The session data indicates, among other things, a state of the session (e.g., started, ongoing, paused, backgrounded, ended), the devices that belong to the group, and the state of each device with respect to the function's output (e.g., whether a device of the group is outputting audio content or not in the example of music streaming). The state of the session can change as long as the session has started and has not ended yet. Session state changes can be captured by updating the session data to indicate the current state of the session. Further, the membership of a device with the group can change while the session has not ended, whereby providing the function's output to the device can depend on the group membership. For example, the device can be added to the group, resulting in the output being provided to the device. Conversely, the device can be removed from the group, resulting in the output no longer being provided to the device. Group membership changes can be also captured by updating the session data to add or remove identifiers of the devices. Additionally, the state of the device can change while the session has not ended, whereby the presentation of the function's output on the device can depend on the state. For example, and referring back to the music streaming example, the device's state can be idle (indicating that the device is not presenting audio content) or active (indicating that the audio content is presented). Device state changes can be captured by updating the session data to indicate the current state of each device of the group. Because the session is associated with the function, the session information (e.g., the session identifier and the session data) can be used to control whether an output of the function is provided to a device and how this output is presented on the device and other devices of the group, as further described herein below.

Hence, a session-based approach to dynamically group devices for the execution of a function provides several improvements. For example, this approach allows flexible and scalable control of how the function is provided to devices. In particular, it is possible to relatively quickly (e.g., with reduced latency) update the session data to reflect a change to the session's state, the group membership, and/or device's state. Even if the execution of the function transfers to another application (e.g., from a first music streaming application to a second music streaming application), the session information can still be used for the control.

To illustrate, consider an example of two devices capable of outputting music streams and a computer system (e.g., a computing cloud-based system) that interfaces with the two devices and is capable of providing music for playback. The computer system receives first user input data from the first device (e.g., via a graphical user interface or a voice user interface thereof), where this data indicates a request to play music on the first device. Accordingly, the computer system causes the music data to be sent to the first device. The computer system also generates a session identifier for a music-playing session. Thereafter, the computer system receives second user input data (e.g., from the first device, the second device, or elsewhere) to also play the music on the second device. In response, the computer system can generate new session data identifying the two devices, indicating that they are associated with a music function, and indicating that the first device is to synchronize the music output across the two devices. As a result, the computer system can send a directive to the first device to send the music data to the second device (e.g., over a direct connection between the two devices) and to time synchronize the outputting of this music data on the second device with its own output. Subsequently, third user input data is received and requests that the music output stops on the second device. Here, the computer system updates the session data to remove the identifier of the second device and/or indicate an idle state of the second device. Another directive can be sent to the first device to stop the transmission and synchronization of the music audio. Yet upon the receipt of fourth input data to re-enable the music stream on the second device, the computer system can update the session data and send the relevant directive to the first device.

FIG. 1 illustrates an example of session-based grouping of devices, according to embodiments of the present disclosure. As illustrated, the session-based grouping includes multiple stages: a dynamic group set-up stage 101, a dynamic group modification stage 102, and a dynamic group termination stage 103. Generally, a session-based approach is used in the different stages 101-103, where a session is associated with a function to be performed resulting in a particular user experience and session information about the session is generated and maintained. During the dynamic group set-up stage 101, a computer system 110 sets up a device group 120 that includes one or more user devices for which the function is executed. During the dynamic group modification stage 102, the computer system 110 modifies the device group 120, resulting in an updated device group 122. The modification can include any or a combination of adding a device, removing a device, or changing how the function is executed for a device. In the dynamic group termination stage 103, the computer system 110 determines that the session has ended, where the execution of the has terminated resulting in a terminated device group 124.

In an example, the computer system 110 can include hardware and software suitable for implementing the session-based approach and communicating with devices and other computer systems (e.g., third party computer systems). For instance, the computer system 110 can be implemented as a set of servers or a set of components on servers (e.g., in a datacenter). The computer system 110 implements a session application 130 that maintains a session identifier 132 for the session across the different stages 101-103, maintains session data to identify devices of the dynamic group and, optionally, states of these devices or components on these devices, and maintains a session state indicating the state of the session. In addition, the computer system 110 implements a dynamic group manager 140 that executes logic controlling whether a device can be added to or removed from a dynamic group, whether a state associated with the device can be changed, and/or whether a change can be made to the execution of the function for the device.

In an example, the function relates to providing content to one or more devices. For instance, the function can be to stream audio (music, audible, etc.), stream video (e.g., on-demand or a live broadcast), provide connectivity (e.g., phone calls, teleconferences, etc.), audio/video surveillance (e.g. home security systems, etc.) and the like. In these different illustrations, content data can include audio data and/or video data. The computer system 110 can implement one or more content applications (FIG. 1 illustrates a content application 150) to provide the function. For instance, the content application 150 stores program code executable as an application or a skill accessible to a device. Additionally, a content application can be implemented by a computer system of a third party. In this case, the computer system 110 can include an interface (e.g., an application programming interface (API) to the third party system).

In the interest of clarity of explanation, embodiments of the present application are described using a content-related function, for example, music playback. However, the embodiments are not limited as such and similarly apply to other types of functions that involve multiple devices. Generally, an execution of a function can be associated with a session identifier and a group of devices can be identified in session data that is associated with the session identifier. In this way, a device can be dynamically added or removed from the group by updating the session data. Further, the device's role in the group with respect to the output of the function can be also updated in the session data.

In an example, the function relates to controls between devices of the group. For instance, based on a trigger event, a session identifier and session data can be generated, where the session data indicates that a first device can control the output of a second device. To illustrate, consider the following scenario. A first device (e.g., a mobile phone) is carried by a user and can communicate with a server. A second device is installed in a space (e.g., an office, a living room, etc.), is set up as a controller for a smart appliance (e.g., to control a smart light bulb), and can communicate with the server. Upon the two devices coming into a predetermined proximity to each other and based on predefined permissions, the server generates a session identifier associated with controlling the smart appliance and session data that identifies the first device and the second device as well as that each of the devices can be a controller. The two devices need not paired (e.g., a direct communication link established therebetween). Instead, a request for controlling the smart appliance can be received by the server from the first device and sent to the smart appliance (directly or indirectly via the second device). Alternatively, the two devices can be paired. For instance, based on the session data identifying both devices, the server can instruct the two devices to establish a communication link therebetween. In this way, control requests of the first device can be sent from the first device to the second device over the communication link. In both implementations (pairing or no pairing), because the two devices belong to the same group, states and/or configuration of the smart appliance (e.g., ON, OFF, brightness, color set-up, etc.) can be presented by the first device. Upon the two devices no longer being in a predetermined proximity to each other (e.g., the user leaving the space), the server can terminate the group by deleting the session data and the session identifier. Although this illustration is for a group of two devices, the server can similarly indicate that the smart applicant belongs to the group by including an identifier thereof in the session data and an indication that the smart is appliance is a controlled device.

As an example, the function can relate to content associated with a user account with which a first device, but not a second device, is registered. For instance, based on a trigger event, session identifier and session data can be generated, where the session data indicates that the two devices belong to a group and that the content is available to the second device. To illustrate, consider the following scenario. A first device (e.g., a mobile phone) is carried by a user, is associated with an account of the user, and can communicate with a server. The user may have operated the first device or another device to store content associated with the user account (e.g., a grocery list). A second device is installed in a space (e.g., a grocery store), is set up as an interface to a function (e.g., to add groceries to an electronic shopping cart), and can communicate with the server. Upon the two devices coming into a predetermined proximity to each other and based on predefined permissions, the server generates a session identifier associated with the function (e.g., grocery purchase) and session data indicating that the two devices are grouped together and that access of the second device to the content is permitted. Based on this grouping, the second device can pull the content (e.g., receive the grocery list). Upon the two devices no longer being in the predetermined proximity to each other (e.g., the user leaving the grocery store), the server can terminate the group by deleting the session data and the session identifier.

A device can represent an end user device that supports one or more input/output modalities (e.g., including graphical user interfaces and voice-based interfaces) and that can communicate with the computer system 110. For example, the device can be a smartwatch, smartphone, a tablet, a laptop, a desktop, a smart speaker, a voice-controlled device, a smart appliance, an Internet of Things (IoT) device, or any other suitable end user device. Although FIG. 1 describes the computer system 110 generating and maintaining session information and controlling the execution of the function for a device based on the session information, such session-related functionalities and/or function-related controls can be implemented by the device or distributed between the device and the computer system 110.

As illustrated in FIG. 1, the dynamic group set-up stage 101 can be triggered when the computer system 110 determines data indicating a dynamic group set-up request for a particular function (e.g., play music) available from the content application 150 (or, similarly, from a content application of a third party system). Different types of triggers are possible. In one example, a device can send the data to the computer system 110 in response to a user input at the device (e.g., at a graphical user interface and/or a voice user interface). The user input can request the particular function (e.g., a graphical user interface selection of a music album, or a voice user interface interaction to play the music album). In another example, the content application 150 can generate this data by, for instance, outputting a session start event. For instance, a scheduled routine (e.g., one to stream music at a particular time on a recurring basis) can trigger the content application 150 to request a dynamic group in order to perform the function. In yet another example, the computer system 110 can receive the data from a third party system (e.g., a system hosting a third party music application that may have a scheduled routine or that may have received a music stream request).

Based on the data, the computer system 110 causes the function to execute, determines that a session has started, and generates a session identifier 132 for the session. The dynamic group manager 150 can determine the possible devices, select a set therefrom that can participate in the session based on its control logic, and identify the devices of the device group 120 to the session application 130. In turn, the session application 130 stores the session identifier 132 in association with session data 134A and a session state 136A. The session data 134A identifies, among other things, the devices that belong to the device group 120 and, optionally, the state of each of such devices or the state of a content component on each device. The session state 136A identifies a state of the session, such as that the session is being set-up or is ongoing. The content application 150 can receive the session data 134A, or at least the device identifiers of the session data 134A to then send content data 116 to the device group 120 (e.g., to all the devices of the device group 120 or to one of these devices that can then send it to the remaining devices of the device group 120). To enable the output of the content data 116 by the devices of the device group 120, the computer system 140 can send a dynamic group directive 114. This directive 114 represents a command to each of the devices or to one of the devices (e.g., a control device, such as a hub, of the device group 120) about receiving and outputting the content data 116.

As also illustrated in FIG. 1, the dynamic group modification stage 102 can be triggered when the computer system 110 determines data indicating a dynamic group modification request 162 that modifies how the particular function is performed. Different types of triggers are possible. In one example, a device (that may, but need not, belong to the group 120) can send the data to the computer system 110 in response to a user input at the device (e.g., at a graphical user interface and/or a voice user interface). The user input can request the modification function (e.g., a graphical user interface input to add a device, or a voice user interface interaction to remove a device). In another example, the content application 150 can generate this data by, for instance, outputting a session end event. For instance, a scheduled routine (e.g., one to stream music at a particular time on a recurring basis) can further trigger the content application 150 to request the modification over time (e.g., to play the music on devices located on an upper house floor for thirty minutes and then move the music to devices located on a lower floor for the next thirty minutes). In yet another example, the computer system 110 can receive the data from a third party system (e.g., a system hosting a third party music application that may have a scheduled routine or that may have received a music stream modification request).

Because the same function is still being performed and the session has not been terminated yet, the computer system 110 determines that no new session is needed. Here also, the dynamic group manager 150 can select the impacted devices based on its logic (e.g., the possible devices to add or remove), and identify these devices to the session application 130. In turn, the session application 130 uses the session identifier 132 to look up the session data 134A. Next, the session data 134A is updated to identify the impacted devices and, optionally, the relevant states of these devices or content components thereon, resulting in updated session data 134B. The session application 130 can also update the session state 136A to indicate it is ongoing and/or has been modified, resulting in an updated session state 136B. The content application 150 can receive the updated session data 134B, or at least the device identifiers of the session data 134B to then continue sending the content data 116 to the updated device group 122 (e.g., to all the devices of the updated device group 122 or to one of these devices that can then send it to the remaining devices of the updated device group 122). Here also, a dynamic group directive 114 is sent. This directive 114 represents a command to each of the devices or to one of the devices (e.g., a control device, such as a hub, of the device group 120) about receiving and outputting the content data 116.

Further, the dynamic group termination stage 103 can be triggered when the computer system 110 determines data indicating a dynamic group termination request 172 to stop the execution of the function. Different types of triggers are possible. In one example, a device (that may, but need not, belong to the group 120) can send the data to the computer system 110 in response to a user input at the device (e.g., at a graphical user interface and/or a voice user interface). The user input can request the termination (e.g., a graphical user interface input or a voice user interface interaction to stop playing music). In another example, the content application 150 can generate this data by, for instance, outputting a session end event. For instance, the content data 116 can be limited to a particular set of files (e.g., a music album). Upon sending the files and upon no additional user input to renew the performance of the function (e.g., a request to continue playing music), the content application 150 can request the termination (e.g., by sending a session end event). In another illustration, the content application 150 can identify a time period after which the function's execution is to automatically terminate (e.g., a time-to-live session attribute). The computer system 110 can maintain a time counter and, upon its expiration, can determine the termination trigger. In yet another illustration, a scheduled routine (e.g., one to stream music at a particular time on a recurring basis) can further trigger the termination (e.g., by setting a session end even upon a scheduled end time of the routine). In yet another example, the computer system 110 can receive the data from a third party system (e.g., from a third party music application that may have a scheduled routine or that may have received a music stream termination request).

Accordingly, the computer system 110 causes the execution of the function to terminate and determines that the session has ended. For example, the session application 130 removes the updated session data 134B corresponding to the session identifier 132 and can update the session state to indicate that the state is terminated (show as updated session state 136C). As needed, the content application 150 can determine the updated session state 136C and stop outputting the content data 116. Also as needed, a dynamic group directive 174 can be sent to one or more devices of the terminated device group 174 receive to, for instance, released components.

Figure 2:
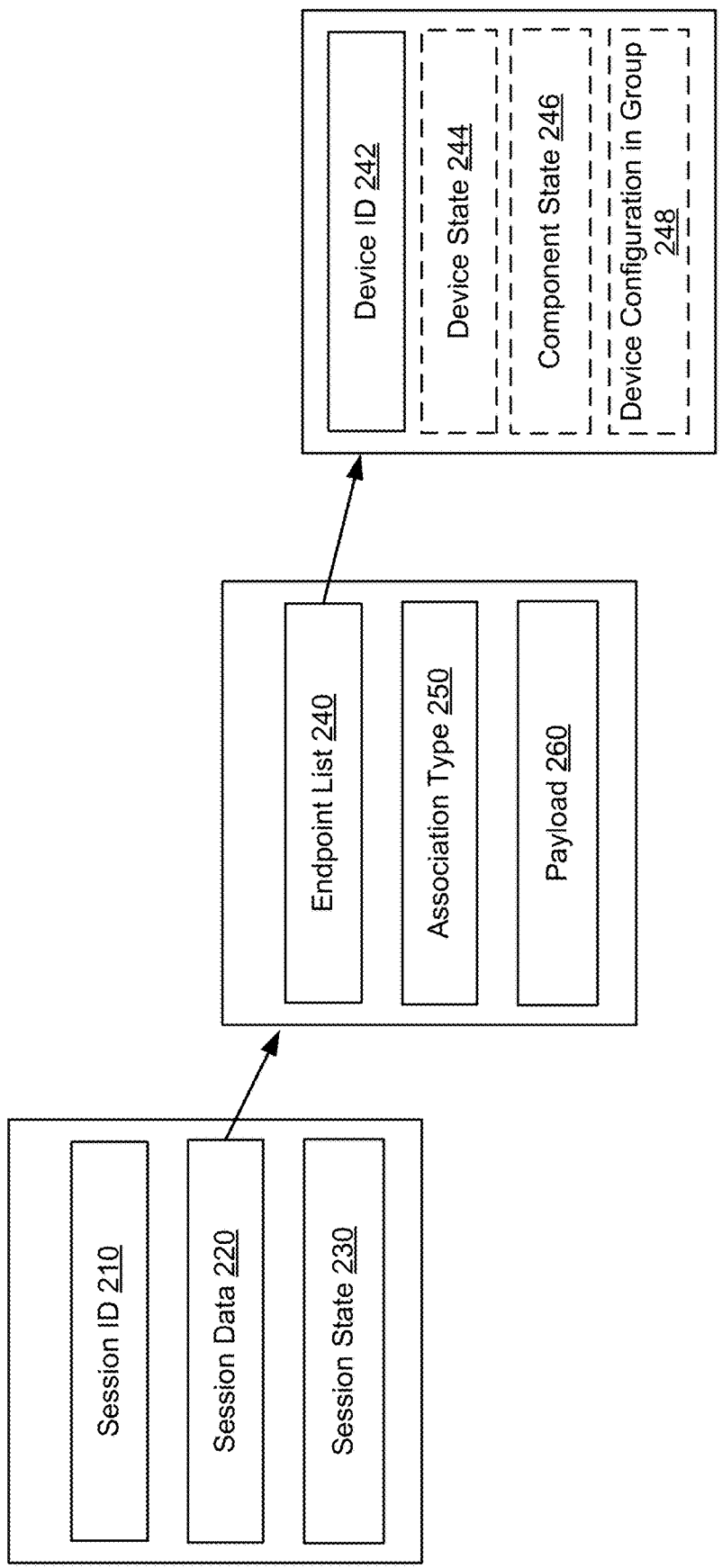
FIG. 2 illustrates an example of a data structure usable for a session, according to embodiments of the present disclosure.

FIG. 2 illustrates an example of a data structure usable to store information about a session, according to embodiments of the present disclosure. The data structure is usable by a system that uses session information to control how a function is provided to devices, such as the computer system 110 of FIG. 1. The computer system can represent the session information by including, in the data structure, a session identifier 210, session data 220, and a session state 230.

In an example, the session identifier 210 can include data that uniquely identifies the session. The session state 230 can include data that identifies a state of the session. For instance, the state can be "set-up" or "active" to indicate that the session is being activated, "ongoing" or "backgrounded" to indicate that the session has been set-up and has not been terminated yet, and "terminated" or "de-active" to indicate that the session is terminated. Of course, other states or number of states can be used.

The session data 220 can represent metadata about the session. In an example, the session data 220 includes an endpoint list 240, an association type 250, and a payload 260. The endpoint list 240 can be information about endpoints forming a dynamic group of devices for which the function can be executed. An endpoint can be a device (physical or virtual) of the dynamic group or an application on the device. The association type 250 can indicate the type of group with regard to the function of the session (e.g., a group for synchronized music stream, a group for a smart home application, etc.). A system that uses the session data 220 to control the definition of the device group and/or that executes the function (e.g., a music source component configured to provide a music stream to a device for music playback by the device) can use the association type 250 to determine a format (e.g., a schema) of the information included in the endpoint list 240. In other words, the information included in the endpoint list 240 is organized according to the format and the association type 250 indicates the format such that the system can process the information. This format can be common to a plurality of systems (e.g., common to a plurality of music source components such that each music source component can parse and determine the information). The payload 260 can include additional information about the endpoints, where this information may not be organized according to a different format. This format can be specific to the system (e.g., specific to the music source component but not to another music source component), such that the additional information can be usable by the system (e.g., usable specifically by the music source component but not by the other music source component). For example, a first system (e.g., a first party system) controls the definition of the device group based on the endpoint list 240 but not the payload 260, and a second system (e.g., a third party system) executes the function based on the endpoint list 240 and the payload 260. In this example, the endpoint list 240 has a first format usable by both systems. However, the payload 260 has a second format that is independent of the first format and that is usable by the second system. According to this approach, information can be added to the payload 260 as an extension field in any format usable by the second system (e.g., the third party system) without impacting the operations of the first system and without necessitating the second system (e.g., any third party system) to use one particular format.

In an example, the endpoint list 240 can be extendible and can include specific information depending on the use case. For instance, for synchronized music streaming across multiple device, the endpoint list 240 can identify one of the devices as a source device that synchronizes the music output (e.g. a hub device). In this illustration, the endpoint list 240 can identify each device and include a "source" attribute for the source device. In comparison, for an audio/visual system that includes multiple devices (e.g., a home theatre system), the endpoint list 240 can identify the configuration of each device with regard to the audio/visual function (e.g., whether a first device is a display device, a second device is a speaker device, and third device is a remote control device). In this illustration, the endpoint list 240 can identify each device and include a "configuration" attribute for each device.

This extendibility of the endpoint list 240 is illustrated in FIG. 2 with the dashed rectangles. In particular, the endpoint list 240 can indicate device identifiers 242, device states 244, component states 246, and device configurations in the group 248. A device identifier corresponds to a device of the dynamic group and uniquely identify the device to the computer system and/or content application. A device state of the device can include data identifying a state of the device in the session. For example, the state can be "idle" indicating that the device is not outputting content, "backgrounded" indicating that the device is outputting content by using a background process, or "foregrounded" indicating that the device is outputting content by using a foreground process. Of course, other states or number of states can be used. A component state can include similar states but for a component of the device. The component can be a an application executed on and used by the device to participate in the session (e.g., an audio player when the session is for playing music). A device configuration in the group indicate how a device is configured in the group to participate in the session (e.g., the device set up as a source for synchronized music streaming, or the device set up as a speaker for home theatre streaming, etc.).

The data structure can be stored as relational or non-relational data. In an example, the session ID 210 and the session data 220 are stored as a key-value pair in a data store, where the session ID 210 is the key, and the session data 220 is the value. Similarly, the session ID 210 and the session state 230 are stored as a key-value pair in the same or a different data store, where the session ID 210 is the key, and the session data 230 is the value. In another example, one or both the session ID 210 and the session state 230 are included in the session data 220 (e.g., in separate fields other or within the endpoint list 240, the association type 250, or the payload 260).

Figure 3:
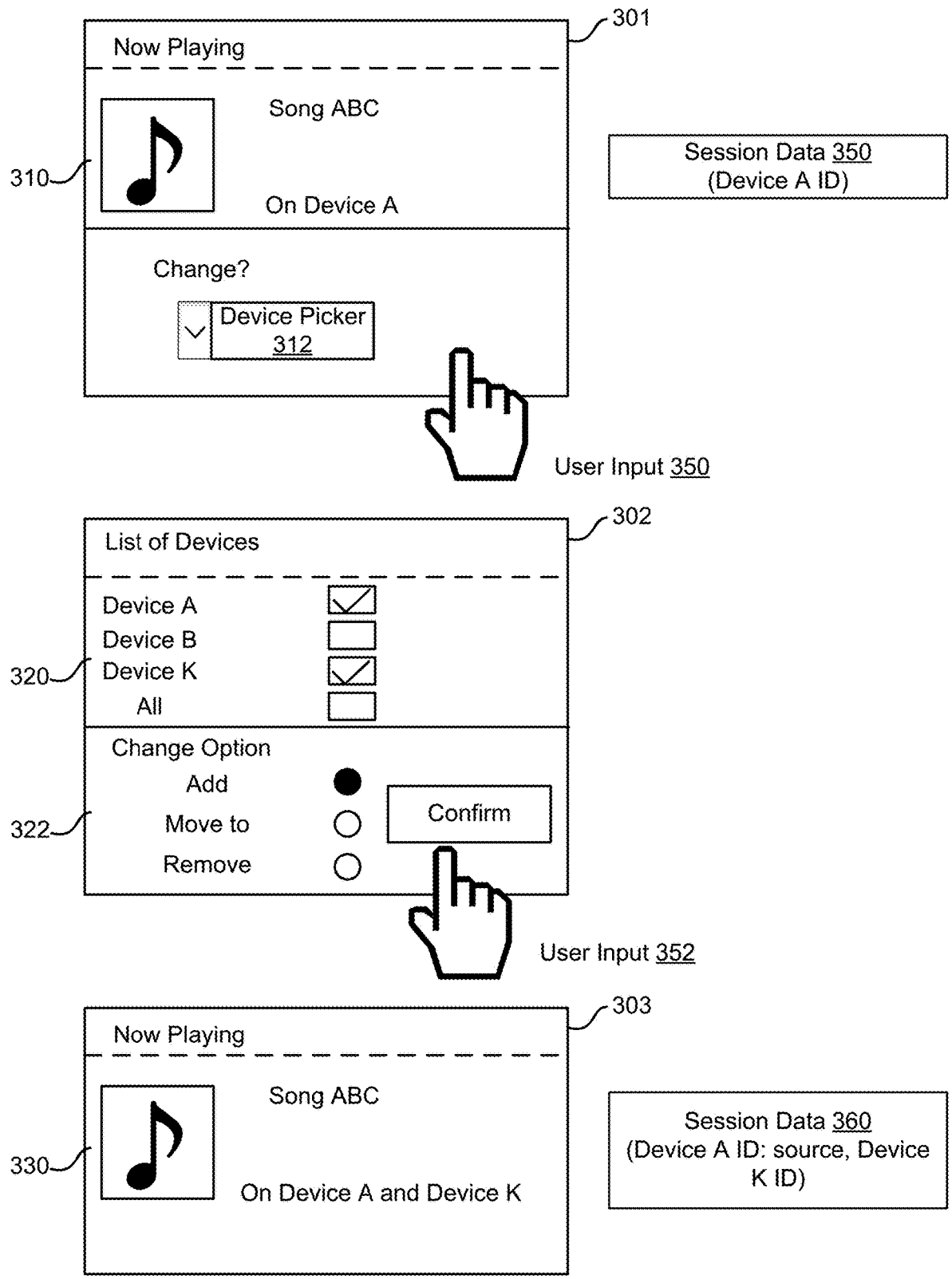
FIG. 3 illustrates an example of graphical user interfaces for selecting content output on a group of devices, according to embodiments of the present disclosure.

FIG. 3 illustrates an example of graphical user interfaces for selecting content output on a group of devices, according to embodiments of the present disclosure. The graphical user interfaces can be presented on a screen of a device. The device can be registered under an account. Devices that can be dynamically grouped can also be registered under the same account. User input can be received on the screen (e.g., in the case of a touchscreen) or from an input device (e.g., a mouse device, a remote control device, etc.) to change the configuration of the dynamic group. In the interest of explanation, music playback available from a music application is described in FIG. 3. Nonetheless, embodiments of the present disclosure are not limited as such.

In an example, the device presents a graphical user interface 301. A first field 310 in the graphical user interface 301 identifies the audio file that is being played (e.g., "song ABC") and the device that is outputting the audio file (e.g., "device A"). In this case, the device (e.g., "device A") can be identified from session data 350 of an ongoing session for the music playback (as illustrated in FIG. 3, the session data 350 includes the identifier of the device as "device A ID"). The graphical user interface 301 can also include a selectable field, shown as a device picker field 312. A user input 350 (e.g., a click, a swipe, etc.) on the device picker field 312 triggers an update to the graphical user interface 301 to present possible devices where the music playback can also be output. The update is shown as a graphical user interface 302.

Data about the user input 350 can be sent to a computer system (e.g., the computer system 110 of FIG. 1) that then determines, based on account information of the account, the different devices. The computer system (e.g., the dynamic group manager 150) determines, based control logic, the possible set of devices that can also output the music playback. This possible set is identified in a first field 320 of the graphical user interface 302. This field 320 also includes selectable options (shown as checkboxes) to select or deselect one or more identified devices. The graphical user interface 302 can also include a second field 322 usable to update how the music playback is to be output on the identified devices. In the illustration of FIG. 3, three selectable options are shown as radial buttons, one to add the music playback to the selected devices (e.g., the ones selected via the first field 320), one to move the music playback to these devices, and one to remove the music playback from these devices. Adding refers to keeping the music playback on the current devices (e.g., "device(s) A") and extending it to at least one other device. Moving refers to removing the music playback from the current device(s) and outputting it on at least one other device. Removing refers to removing the music playback from a selected device(s) without adding or moving the music playback to another device. A user input 352 (e.g., a click, a swipe, etc.) in the first field 320 identifies selected devices, and in the second field 322 triggers an update to the graphical user interface 302 to indicate a desired modification to the music playback. A selectable option to confirm the desired modification can be also presented, whereby once the user selects the modification to the music playback, the confirm option can be selected to trigger the update. The update is shown as a graphical user interface 303.

Data about the user input 352 can be received by the computer system that then determines the selected device(s) and the type of modification. In the illustration of FIG. 3, "device A" remains selected, "device K" is selected, and the modification is to add devices to the music playback. Accordingly, the computer system updates the session data 350 to include the identifier of "device A" (as needed) and the identifier of "device K," resulting the session data 360. In addition, the session data 360 can be updated to indicate that "device A" is the source device for the music playback synchronization (as illustrated in FIG. 3, the session data 360 includes the identifier of the two devices as "device A ID" and "device K ID" and indicates that "device A" is the source by including the "source" attribute in association with the "device A ID"). The music application receives the session data 360 and the music playback is controlled based on this session data 360.

A first field 330 of the graphical user interface 303 shows the audio file that is being played (e.g., this audio file is still "song ABC") and the devices that have been selected and that are outputting the audio file (e.g., "device A" and "device K"). As such, the overall update of the dynamic group (e.g., to add "device K") can be seamless, and performed in real-time at a low latency.

Figure 4:
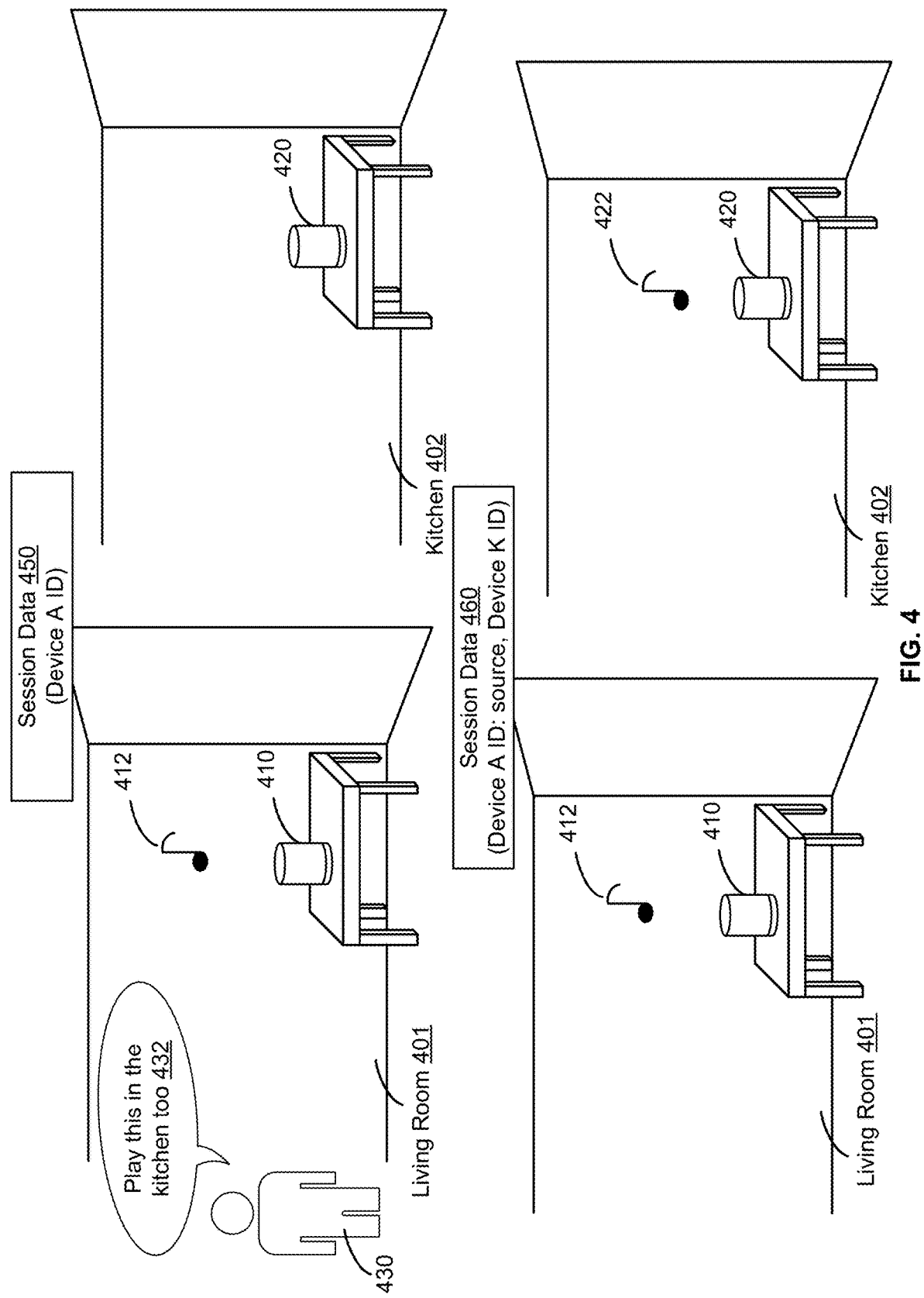
FIG. 4 illustrates an example of a voice user interface for adding content output to one or more devices, according to embodiments of the present disclosure.

FIG. 4 illustrates an example of a voice user interface for adding content output to one or more devices, according to embodiments of the present disclosure. The voice user interface can be available on device that is registered under an account. Devices that can be dynamically grouped can also be registered under the same account. User input can be received via the voice user interface to add one or more devices to the dynamic group. In the interest of explanation, music playback available from a music application is described in FIG. 4. Nonetheless, embodiments of the present disclosure are not limited as such.

In the illustration of FIG. 4, a first device 410 (e.g., a smart speaker) is located in a living room 401 and is outputting audio content 412. Session data 450 is generated for the music playback and includes an identifier of the first device 410 (shown in FIG. 5 as "device A ID"). A second device 420 (e.g., also a smart speaker) is located in a kitchen 402 and is not outputting audio content. The two devices 410 and 420 are registered under the same account and can be identified by the corresponding living space (e.g., by having their living space locations indicated in information stored in the user account information).

An utterance 432 of a user 430 is received by a microphone of the first device 410. The utterance 432 represents user input requesting a modification to the music playback (e.g., "play this in the kitchen too"). Although, not illustrated, the utterance 432 can also include a wakeword that triggers the first device 410 to record and further process the utterance 432. Audio data generated based on the detected utterance 432 can be sent to a computer system (e.g., the computer system 110) that then performs automatic speech recognition (ASR) and natural language understanding (NLU) to generate intent data indicating the modification request (e.g., to add) and to identify the intended device (e.g., the second device 420 located in the kitchen). A dynamic group manager (e.g., the dynamic group manager 140 of FIG. 1) can determine whether the modification request is allowed. If so, a session application (e.g., the session application 130 of FIG. 1) updates the session data 450 of the music playback session to identify the second device 420 and, optionally, the state of the second device 420 and/or of its audio player in the music playback session and the state of the music playback session. In addition, the session data 450 can be updated to indicate that the first device 410 is the source device for the music playback synchronization. FIG. 4 illustrates the updated session data as session data 460 that includes the identifier of the two devices (shown as "device A ID" and "device K ID") and indicates that the first device 410 is the source (show with the "source" attribute in association with the "device A ID"). The music application receives the session data 460 and the music playback is controlled based on this session data 460. Accordingly, the second device 420 can output the audio content 422 in a synchronous manner with the output of the audio content 412 by the first device 410. An example diagram for synchronized music playback is further described in FIG. 16.

Figure 5:
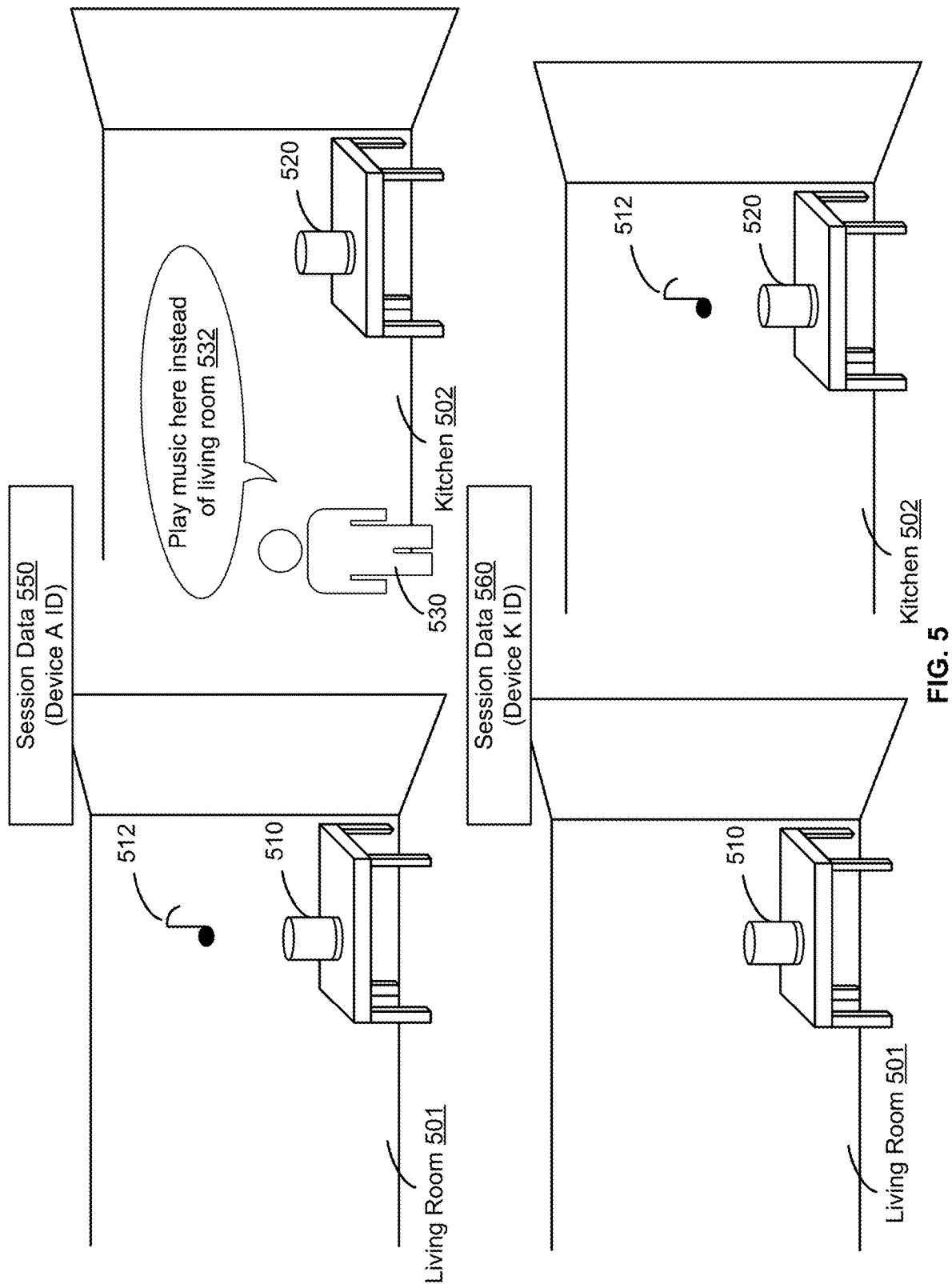
FIG. 5 illustrates another example of a voice user interface for moving content output to one or more devices, according to embodiments of the present disclosure.

FIG. 5 illustrates another example of a voice user interface for moving content output to one or more devices, according to embodiments of the present disclosure. The voice user interface can be available on device that is registered under an account. Devices that can be dynamically grouped can also be registered under the same account. User input can be received via the voice user interface to move the content output to one or more of such devices, thereby removing the device from the dynamic group and adding at least one other device to the dynamic group. In the interest of explanation, music playback available from a music application is described in FIG. 5. Nonetheless, embodiments of the present disclosure are not limited as such.

In the illustration of FIG. 5, a first device 510 (e.g., a smart speaker) is located in a living room 501 and is outputting audio content 512. Session data 550 is generated for the music playback and includes an identifier of the first device 510 (shown in FIG. 5 as "device A ID"). A second device 520 (e.g., also a smart speaker) is located in a kitchen 502 and is not outputting audio content. The two devices 510 and 520 are registered under the same account and can be identified by the corresponding living space (e.g., by having their living space locations indicated in information stored in the user account information).

An utterance 532 of a user 530 is received by a microphone of the second device 520. The utterance 532 represents user input requesting a modification to the music playback (e.g., "play music here instead of living room"). Although, not illustrated, the utterance 532 can also include a wakeword that triggers the second device 520 to record and further process the utterance 532. Audio data generated based on the detected utterance 532 can be sent to a computer system (e.g., the computer system 110) that then performs ASR and NLU to generate intent data indicating the modification request (e.g., to move) and to identify the intended device (e.g., the second device 520 located in the kitchen). A dynamic group manager (e.g., the dynamic group manager 140 of FIG. 1) can determine whether the modification request is allowed. If so, a session application (e.g., the session application 130 of FIG. 1) updates the session data 550 of the music playback session to identify the second device 520 and, optionally, the state of the second device 520 and/or of its audio player in the music playback session and the state of the music playback session. In addition, the session data 550 can be updated to remove the identifier of the first device 510 or to change its state (e.g., to "idle"). FIG. 5 illustrates the updated session data as session data 560 that includes the identifier of the second device 520 but not the first device 510 (shown as "device K ID"). The music application receives the session data 560 and the music playback is controlled based on this session data 460. Accordingly, the second device 520 can receive and output the audio content 512, whereas the first device can stop receiving and outputting the audio content 512.

The above examples of FIGS. 4 and 5 are provided for illustrative purposes only. Many other uses are possible based on session data maintained for a dynamic group. For example, and referring to FIG. 4, the addition of the content output to the second device 420 can be triggered by an utterance detected by the second device 420 or any other device registered under the user account. Similarly, and referring to FIG. 5, the moving of the content output to the second device 520 can be triggered by an utterance detected by the first device 410 or any other device registered under the user account.

In FIGS. 4 and 5, a synchronous music playback experience is illustrated. However, the embodiments similarly apply to an asynchronous music playback experience. For example, a dynamic group can be defined to include multiple devices, where each device or set of devices can be configured to output a different audio file in parallel (e.g., to play relaxing music in the living room and to play cooking music in the kitchen).

In yet another use case example, a dynamic group can be defined for a music playback experience. Upon a user input to pause this experience, the content output may be paused across the different devices. The computer system can maintain the state of the music playback session and update the session data to indicate the pausing. Subsequent user input can be received to play music content. Depending on data and/or timing of this user input, the state can be changed from paused to resumed such that the music playback continues on the same set of devices or a different set of devices, or the state can be changed to terminated and new session information for a new session can be generated. For instance, if the user input is a "resume my music" utterance that is received within a predefined time period from the previous input (e.g., within ten minutes), the state is changed to resumed and no change is made to the set of devices (e.g., the session data need not be updated). In comparison, if the user input is a "resume my music in the kitchen" utterance, the state is changed to resumed and the session data is updated to identifying that the music playback is to be resumed using only the set of devices in the kitchen. In this case, the session data is updated to remove identifiers of living room devices or to change their state to idle. In another illustration, if the user input is received after the predefined time period, the state can be changed to terminated and a new session identifier and new session data are generated. Similarly, if the user input is unrelated to the music playback experience that has been paused (e.g., the user utterance is for "play an audible book"), the state can be changed to terminated and a new session information can be generated and includes a new session identifier and new session data.

In a further example, the session-based approach can be used for casting content. For instance, and referring back to FIGS. 4 and 5, assume that a third device and fourth device are registered under the user account. The third device is a mobile device, and the fourth device is a smart speaker located in a child's bedroom. The user 530 is initially listening to music on their mobile device while driving, where the music is available from a content application (e.g., the content application 150 of FIG. 1). The computer system generates session information about the music playback session by identifying all four devices in the session data and by indicating that only the third device has an active state. Upon arrival to the house, proximity of the mobile device to the remaining three devices is detected. Control logic is then used to determine one or more of these three remaining devices as being suitable for the cast. The session data is accordingly updated to change the states of the devices. A directive is then sent to the mobile device to perform music casting. For instance, if the control logic indicates that casting to all three devices are possible, the session data can be updated to set their states to active. If the control logic indicates that casting to only the most proximate device is possible, the session data can be updated to set the state of only this device to active. If the control logic indicates, based on the music content including profane language not suitable for a child (e.g., based on an audience suitability rating), that the casting is only possible for the living room and kitchen devices, the session data can be updated to set the states of these two devices to active, whereas the state of the child's bedroom device remains idle. If the control logic indicates, based on the living room already outputting other content, that the casting is only possible for the kitchen and child's bedroom devices, the session data can be updated to set the states of these two devices to active, whereas the state of the living bedroom device remains idle for the current music playback session.

In addition, the use of the session data can persist across multiple applications as long as the session has not ended. For example, and referring back to FIG. 4, when the user 430 adds the content output to the second device 420, this modification can necessitate a change of the content application (e.g., the content is to be streamed from a different content application to the first device 410 and the second device 420 and/or this stream can use a different music application than what was used before the modification). Similarly, and referring back to FIG. 5, when the user 530 moves the content output to the second device 520, this modification can necessitate a change of the content application (e.g., the content is to be streamed from a different content application to the second device 420 and/or this stream can use a different music application than what was used before the modification). In both examples, because the user experience remains the same (e.g., to a music playback experience), the same session information can be used. In this case, the computer system may simply need to update the session data. In case a different application is used, the session data can be updated with state data about the content component on the second device (e.g., the specific application to use).

In yet another use case example, the session data can cover different modalities and capabilities. For instance, a home theater experience can be supported. In this illustration, multiple devices can be registered under an account and can each support multiple modalities (e.g. a touch screen and a microphone/speaker). A session can associated with the home theater experience, where the session data indicates that a first device is to be set as a display for outputting video data, a second device is to be set as a speaker for outputting audio data, and a third device is to be set as a remote control to provide user control functionalities and as a hub to synchronize the video and audio outputs. Based on user input, the home theater configuration can be easily changed, whereby the video and audio outputs can be swapped between the first two devices. In this case, the session data is updated to indicate that the first device is now configured as the speaker, whereas the second device is now configured as the display.

Figure 6:
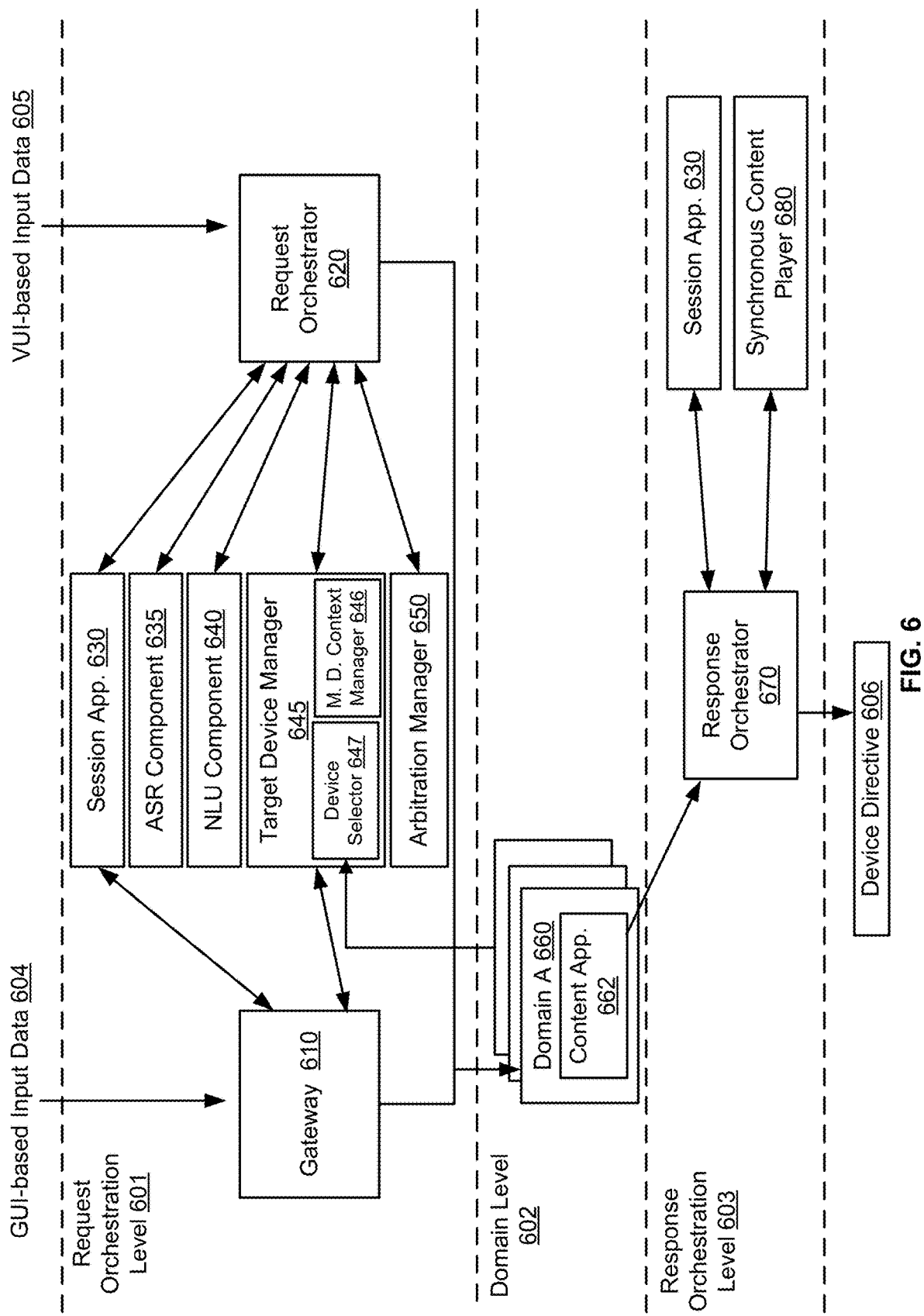
FIG. 6 illustrates an example of components of a system that supports session-based grouping of devices, according to embodiments of the present disclosure.

FIG. 6 illustrates an example of components of a system that supports session-based grouping of devices, according to embodiments of the present disclosure. The system can include components implemented as program codes on a set of hardware. In the illustration of FIG. 6, the components can be organized along multiple logical levels, such a request orchestration level 601, a domain level 602, and a response orchestration level 603. The request orchestration level 601 includes components for receiving and processing data corresponding to user inputs. This data can be passed to the domain level 602 includes components that provides functions and that can be organized in domains. The response orchestration level 603 for providing output response data based on the processing of the request orchestration level 601 and the domain level 602.

In the illustration of FIG. 6, two types of user input data can be supported: GUI-based input data 604 and VUI-based input data 605. The GUI-based input data 604 corresponds to user inputs received via graphical user interfaces, whereas the VUI-based input data 605 corresponds to user inputs received via voice user interfaces. These two types of data have different processing paths in the request orchestration level 601. In particular, the request orchestration level 601 includes a gateway 610 for processing the GUI-based input data 604 and a request orchestrator 620 for processing the VUI-based input data 605.

The gateway 610 can determine, from the GUI-based input data 604, a request of a function (e.g., play music, provide list of devices playing music, etc.) and trigger the requested function (e.g., by sending a directive to a music application in the domain level 602, by retrieving session data from a session application 630 to determine the devices in a dynamic group outputting music content, etc.). The gateway 620 can also host program code for a dynamic group manager (e.g., the dynamic group manager 150 of FIG. 1) that can communicate with a target device manager 645 to identify target devices for the function and apply control logic to select a set of such target devices.

The request orchestrator 620 can send audio data from the VUI-based data 605 to an ASR component 635 to receive back representative of the audio data and can send this text to an NLU component 640 to receive intent data and contextual data. The intent data and contextual data can represent a request of a function (e.g., play music, provide list of devices playing music, etc.). The request orchestrator 620 can also host program code for a dynamic group manager (e.g., the dynamic group manager 140 of FIG. 1) that can communicate with the target device manager 645 to identify target devices for the function and apply control logic to select a set of such target devices. The target device manager 645 can include a multi-device context manager 646 and a device selector 647. The multi-device context manager 646 can determine, for a device, a context of the device including, for instance, the capability and/or availability of a device to support a function (e.g., to play music, to play a movie, etc.). The device selector 647 can determine, based on the context of the device and a call from a domain for a function (e.g., an API call from a music domain to play music), whether the device can be added to a list of target devices. Based on the intent data and contextual data, an arbitration manager 650 can assist with determining a final set of target devices and network routing data to communicate with such devices.

Depending on the function and identified device(s), both the gateway 610 and the request orchestrator 620 can send data, through APIs, to the domain level 602 to invoke the relevant content application(s) 662. The domain level 602 can include multiple content applications, each of which can belong to a domain 660. For instance, a music domain can include one or more music streaming applications. A movie domain can include one or more video streaming applications. Based on API calls, a content application can be invoked. A handle request can be sent from the content application of the domain level 602 to the response orchestration level 603. A response orchestrator 670 of the response orchestration level 603 receives this request, determines the applicable workflow to output response data. The response data can be sent as directive 606 to one or more devices. To generate the response data, the orchestrator 670 can request and receive session data from the session application and can request an update to the session data. In addition, depending on the function, the response orchestrator 670 can send one or more directives needed to perform the function. For example, in the case of a synchronous music playback function, a directive can be sent to a synchronous content player 680 that may be a part of a music content application of a music domain. In the case of a music playback that necessitates streaming from a third party content application or that necessitates synchronization of the music output on third party devices, a directive can be sent to the relevant third party system and/or application.

FIGS. 7-13 illustrate examples of flows for implementing a session-based approach in support of dynamic grouping of devices. Operations of the flows can be performed by a computer system, such as the computer system 110 of FIG. 1. Some or all of the instructions for performing the operations can be implemented as hardware circuitry and/or stored as computer-readable instructions on a non-transitory computer-readable medium of the computer system. As implemented, the instructions represent components that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

Figure 7:
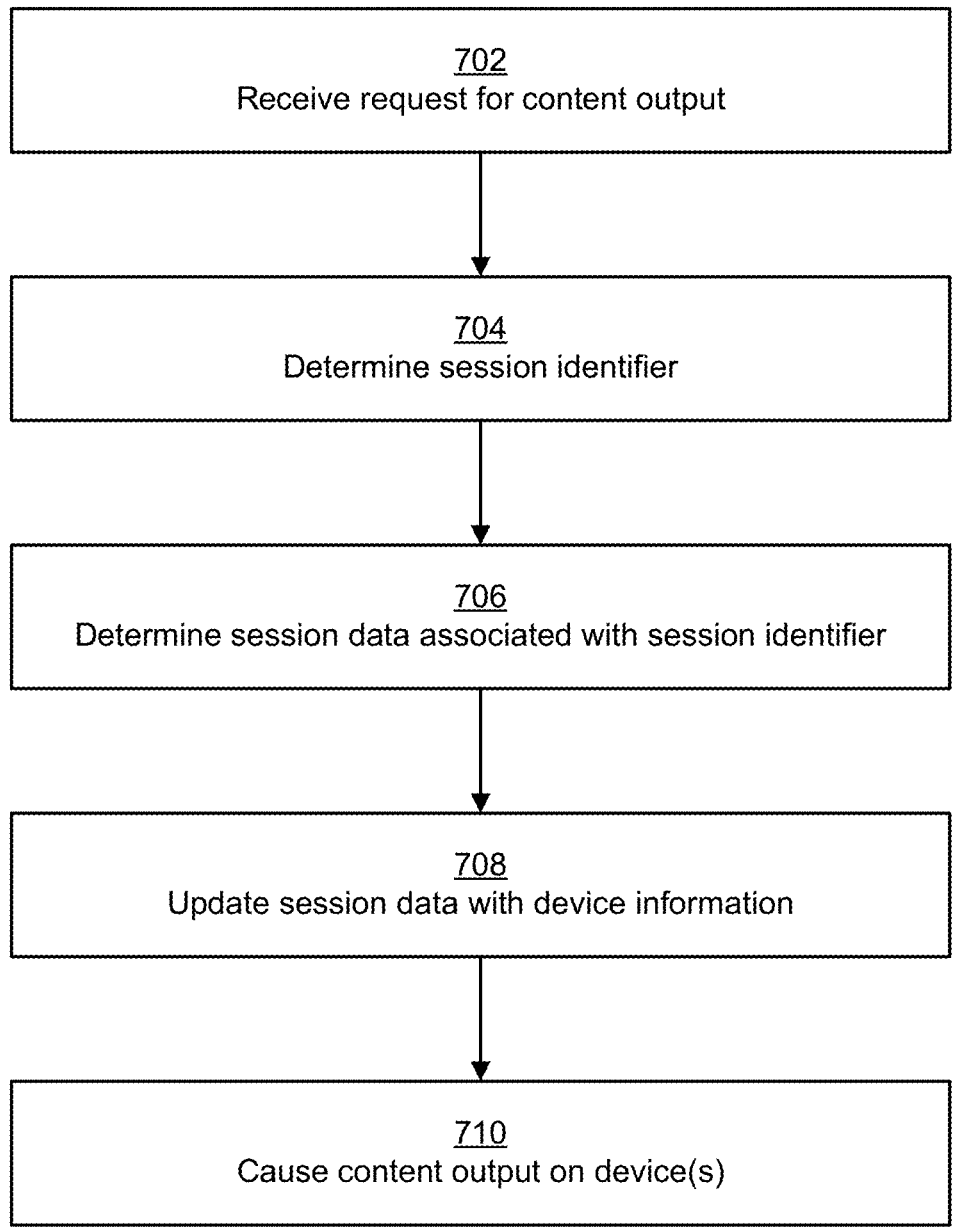
FIG. 7 illustrates an example of a flow for grouping devices based on a session, according to embodiments of the present disclosure.

FIG. 7 illustrates an example of a flow for grouping devices based on a session, according to embodiments of the present disclosure. In an example, the session can be associated with a content-related function and may have a session identifier. At operation 702, the computer system receives a request for content output. The content output relates to the execution of the function by a computing component, such as an application of the computer system or another computer system. In an example, the computer system can receive request data from a device requesting the content output (e.g., to play music, to play a movie, etc.) based on a user input at the device or on an execution of an application that automatically sends the request data. In another example, the computer system can receive request data from the content application (e.g., upon a routine that automatically schedules the execution of the function, such as to stream music at a particular time of day).

At operation 704, the computer system determines a session identifier based on the request. In an example, the request data can include the session identifier. In particular, when the function is first initiated and the associated session identifier is generated the computer system includes the session identifier in a token. The token can be distributed to the device and/or the content application. When this device and/or content application sends data related to the function to the computer system, such as the request data of operation 702, this token is included in the data. Accordingly, the computer system can parse the request data, determine the token, and extract the session identifier therefrom.

At operation 706, the computer system determines session data associated with the session identifier. For example, the session data can be stored in a data store and the session identifier can be used in a query to the data store. In a particular illustration, the session identifier and the session data are stored as a key-value pair, whereby the session identifier is used in a look up of this key-value pair to determine the session data.

At operation 708, the computer system updates the session data with device information. The device information can include an identifier(s) of a device(s) to be added to the group, an identifier(s) of a device(s) to be removed from the group. In addition, the device information can indicate a state(s) of a device(s) to be added to the group or a change to a state(s) of a device(s) that already belongs to the group. Such state information can also be indicated in the session data for a content component on a device. Further, the device information can indicate a configuration(s) of a device(s) to be added to the group or a change to a configuration(s) of a device(s) that already belongs to the group. As explained herein above in connection with FIG. 2, such device information can be added in an endpoint list of the session data. In an example, the computer system determines, based on the request data, a modification to the session (e.g., add a device, remove a device, etc.). The computer system can also determine a set of devices to which the modification applies, where these devices can be identified in the request data, identified from user account information, and/or selected based on a control logic. The device information is generated depending on the requested modification and the selected device(s).

At operation 710, the computer system causes the content output on the selected devices. For example, the computer system can send one or more directives to one or more of the selected devices and/or to one or more content applications. For instance, in the case of adding music playback to a second device, the computer system can send a directive to the first device to send the music stream from the music application to the second device over a data connection therebetween and to synchronize the music output on the second device.

Figure 8:
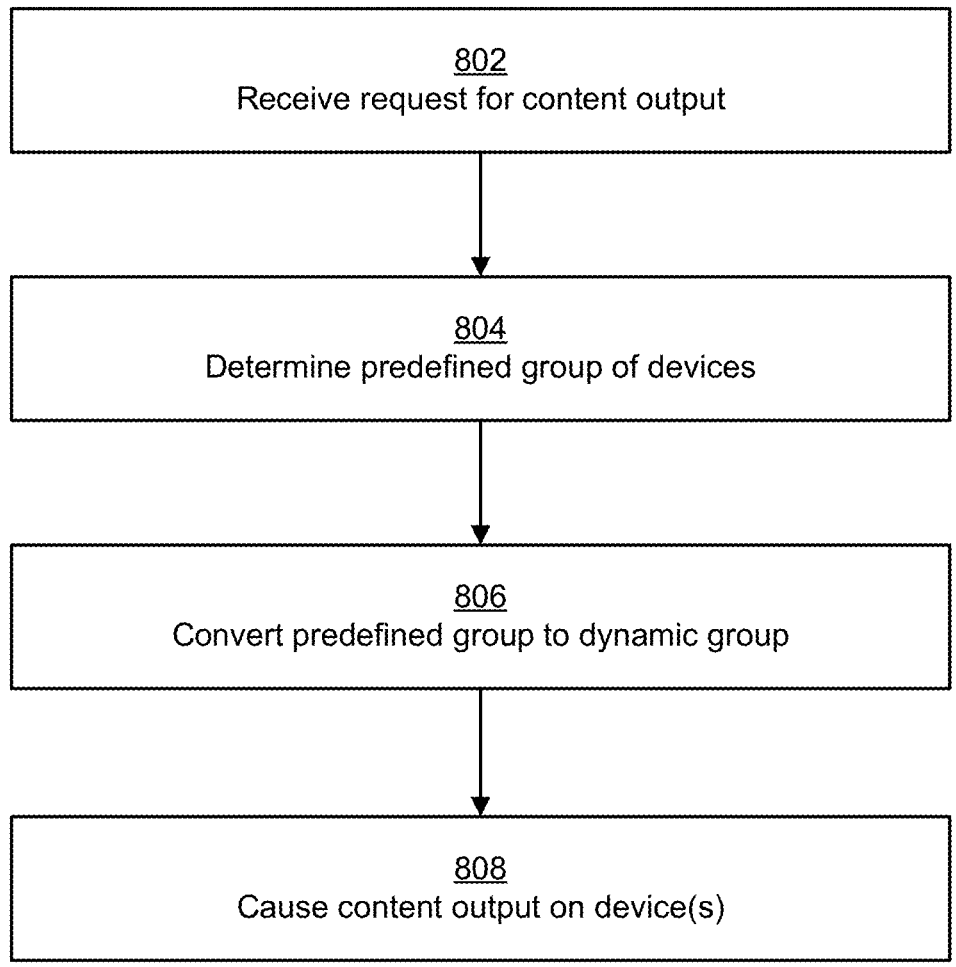
FIG. 8 illustrates an example of a flow for converting a predefined group of devices into a dynamic group of devices, according to embodiments of the present disclosure.

FIG. 8 illustrates an example of a flow for converting a predefined group of devices into a dynamic group of devices, according to embodiments of the present disclosure. In an example, devices are associated in a user account. User account information can indicate that a set of these devices are grouped together in the predefined group (e.g., the user account can indicate that three particular devices are grouped together in a group called "basement"). Upon receiving a request for a function to be performed for the predefined group and initiating the execution of the function, the computer system determines that a session associated with the function has started and can convert the group to a dynamic group. The conversion includes defining session data for the group, thereby allowing the flexibilities of dynamic grouping as described in the present disclosure.

At operation 802, the computer system receives a request for content output. The content output relates to the function. In an example, the computer system can receive request data from a device requesting the content output (and identifying the predefined group (e.g., "play music in the basement")) based on a user input at the device or on an execution of an application that automatically sends the request data. In another example, the computer system can receive such request data from a content application (e.g., upon a routine that automatically schedules the execution of the function, such as to stream music at a particular time of day to the "basement" device group).

At operation 804, the computer system determines the predefined group devices. For example, the identifier of the group is determined from the request data. This identifier is used to look up the user account information to determine the identifiers of the devices that belong to the predefined group.

At operation 806, the computer system converts the predefined group to a dynamic group. For example, the computer system uses the predefined group's identifier in a query to a data store and receives back the identifier of each device that belongs to the predefined group. The computer system also generates and associates session data with the session identifier. Next, the computer system includes the device identifiers in the session data. Other information can be included in the session data depending on the function. For example, in the case of synchronized music playback, the session data can include device configuration data indicating that one of the devices is a source device. In the case of a home theatre set-up, the session data can include device configuration data indicating that one of the devices is set up as display, another device is set up as an audio output device, and yet another device is set up as a controller.

At operation 808, the computer system causes the content output on the devices. For example, the computer system uses the session data to cause the output. For instance, in the case of synchronized music playback, the session data can identify a first device as the source. A directive can be sent to a music application to send audio data to the first device. A directive can also be sent to the first device to send the audio data to other devices of the dynamic group and to synchronize the music output on these devices.

Figure 9:
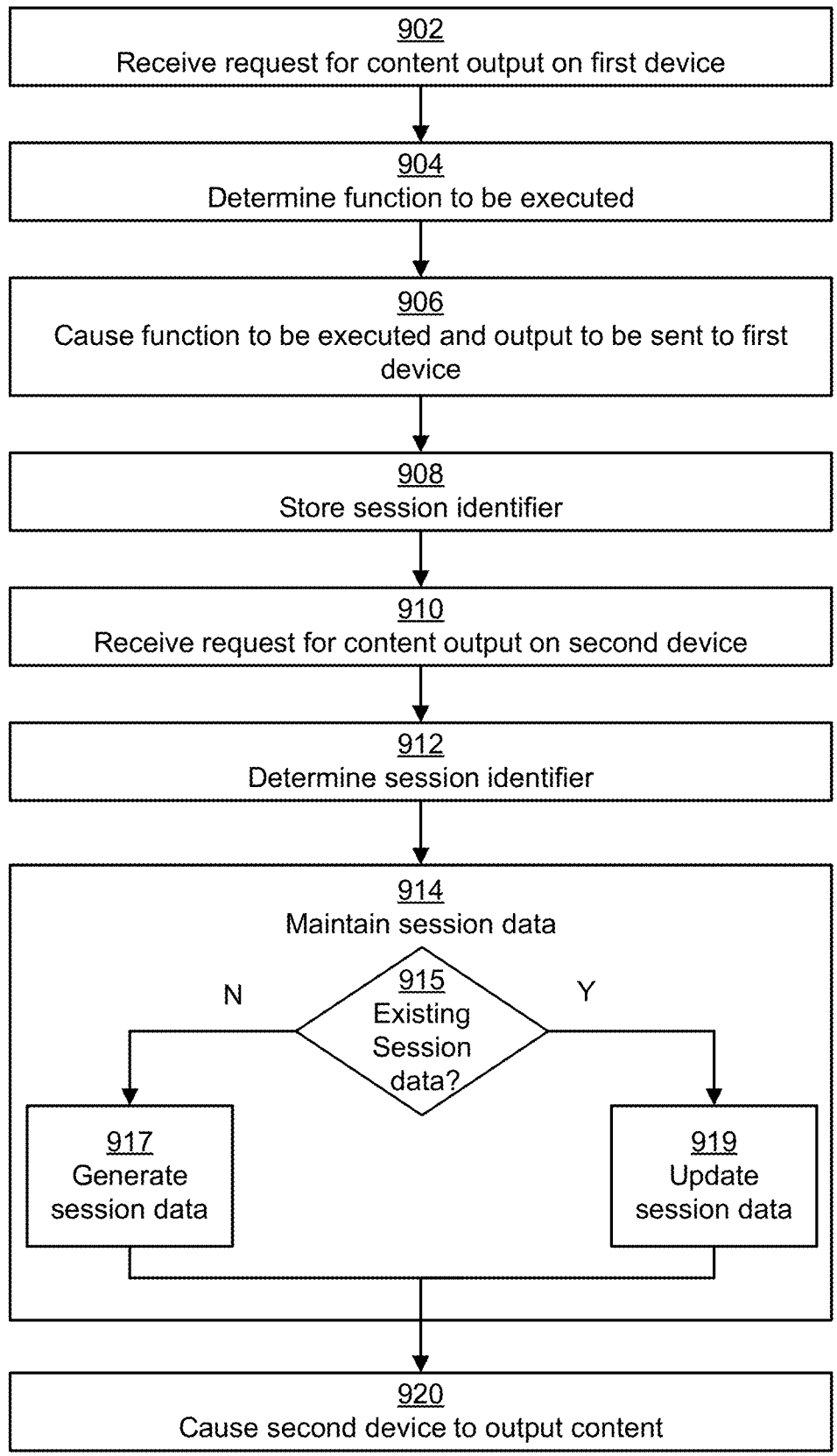
FIG. 9 illustrates an example of a flow for defining a dynamic group of devices in a session, according to embodiments of the present disclosure.

FIG. 9 illustrates an example of a flow for defining a dynamic group of devices in a session, according to embodiments of the present disclosure. The flow is described in connection with two devices. However, the flow similarly apply to a larger number of devices. The session can be initiated when content output is requested on the first device. Subsequently, a modification can be made, where a request is made to add or move the content output to the second device. The session is maintained and its session data is updated to indicate the modification.

At operation 902, the computer system can receive a request for content output on the first device. In an example, the computer system can receive request data from the first device, from another device, or from a computing component (such as one storing program code of application (e.g., an audio application or a content application that supports a set of audio functions or content functions)). For instance, the request data is received via a GUI of the first device, is received after ASR and NLU processing of audio data received from the VUI of the first device, or is received as a request from a computing component upon an execution of a routine, as described in the dynamic group set-up state 101 of FIG. 1.

At operation 904, the computer system can determine a function (e.g., an audio function or a content function) is to be executed based on the request data. The execution can cause outputting audio or other type content by the first device. The function can be determined depending on the type of request that is received. For instance, when the request data is received via the GUI, this data can explicitly identify the function and the computing component (e.g., a GUI selection of a music playback using a particular music playback application). In another illustration, when VUI input is used, the output of ASR and NLU processing can indicate the requested function and, possibly, the computing component. In case the computing component is not identified (e.g., the music playback application), the computer system can request this identification via the VUI or make a selection (e.g., based on a user setting). When the request is received from the computing component, this request can include an object that identifies the requested function.

At operation 906, the computer system causes the function to be executed and the content output to be sent to the first device. For example, the computer system generates a session identifier and sends, to the computing component, a request that includes objects having a particular format (e.g., in a JavaScript Object Notation (JSON) format), where the objects trigger the computing component to execute the function (e.g., to execute program code of a content application that provides the function). The objects can include the session identifier and an attribute (e.g., set to "new") to indicate that the computer system has associated the function with a new session. The computing component can send, to the computer system, a response having a same format (e.g., the JSON format). Objects of the response can include the session identifier, text string that the computer system can use for a text-to-speech output at the first device, a time-to-live session attribute (e.g. a time out period for the execution of the content application), and other objects to provide the content output to the first device (e.g., source a music file in the case of the music playback, where the source can be identified with a uniform resource locator (URL) or a uniform resource identifier (URI)). The computer system can send one or more directives to the first device based on the response of the computing component. This directive can also include the session identifier and instructions to the first device to receive and output the content (e.g., instructions for a music player of the first device to play music from the source).

At operation 908, the computer system stores the session identifier. In addition, the computer system can optionally generate session data because, so far, the group consists of one device only. This session data can include the identifier of the device and other relevant information, as described in connection with FIG. 2. In an example, the session identifier and the session data are stored as a key-value pair, where the session identifier is the key and the session data is the value.

At operation 910, the computer system receives a request for the content output on the second device. In an example, the computer system receives request data, similar to the one received at operation 902. Here, however, the request data can indicate a modification to how the content output is to be provided. The modification can be to move or add the content output to the second device.

At operation 912, the computer system determines the session identifier based on the request data received at operation 910. In an example, and as explained herein above, the session identifier can be included in a token that is received from the requesting device and/or content application. The computer system can parse the request data, determine the token, and extract the session identifier.

At operation 914, the computer system maintains the session data. In an example, the computer system determines, at sub-operation 915, whether the session data has already been generated and stored. In this example, the computer system uses the session identifier in a query. If the query result is null, the computer system determines that no session has been generated. In this case, sub-operation 917 is performed, where the computer system generates the session data. If the query result identifies existing session data, sub-operation 919 is performed, where the computer system updates this session data. In both cases, the session data includes the identifier of the second device and, depending on the modification, includes the identifier of the first device (e.g., when the modification is to add the content output). Other device information can also be included in the session data as described in connection with FIG. 2.

At operation 920, the computer system causes the second device to output the content. For example, the computer system can send one or more directives to one or more of the selected devices and/or to one or more computing components. For instance, in the case to add music playback to the second device, the computer system can send a directive to the first device to send the music stream from the music application to the second device and to synchronize the music output on the second device. In the case of moving the content output to the second device, a directive can be sent to the content application to stream the audio data to the second device, a directive can be sent to the second device to receive and output the audio data, and a directive can be sent to the first device to stop reception and outputting of the audio data.

Figure 10:
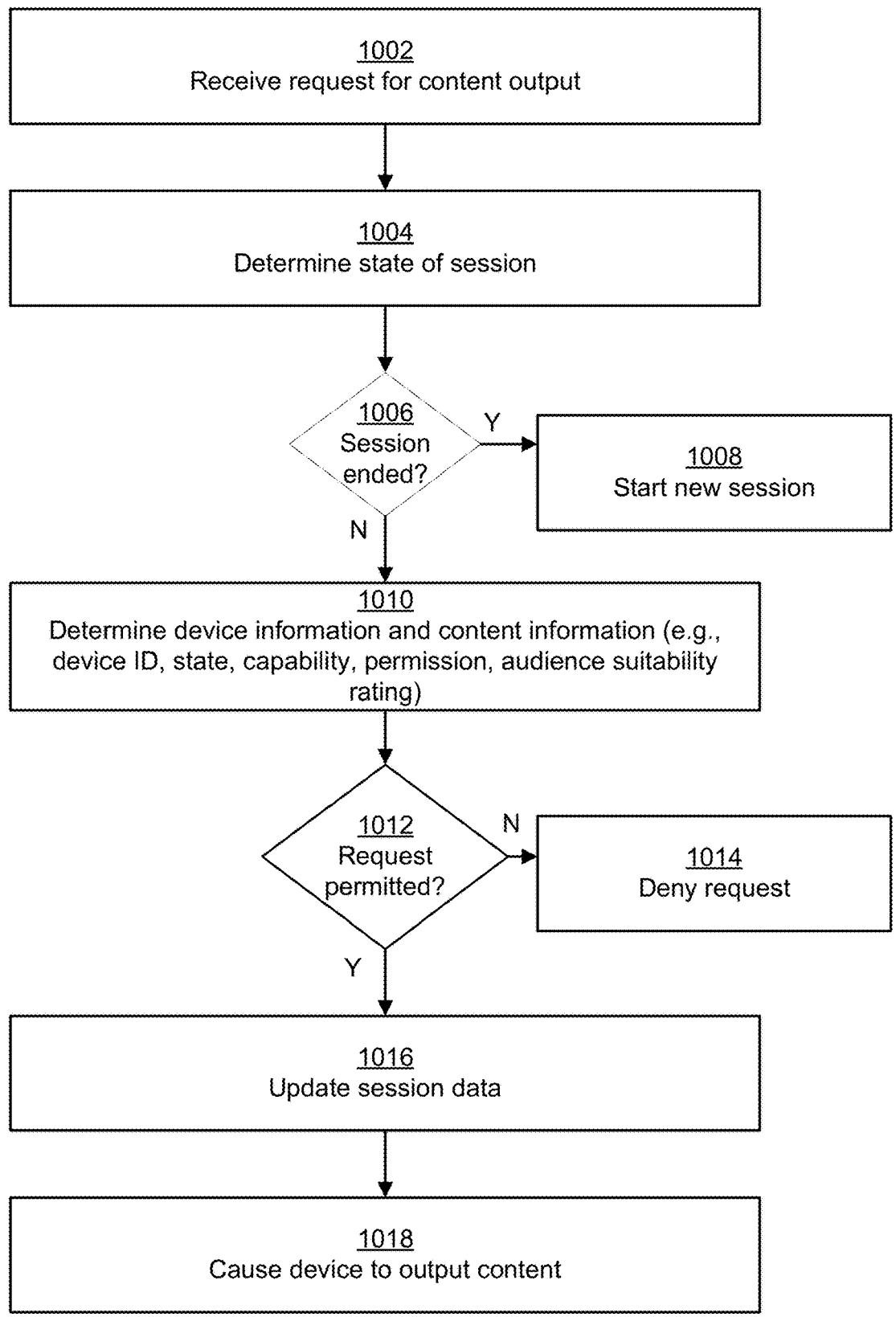
FIG. 10 illustrates an example of a flow for using state information to define a dynamic group of devices in a session, according to embodiments of the present disclosure.

FIG. 10 illustrates an example of a flow for using state information to define a dynamic group of devices in a session, according to embodiments of the present disclosure. The state information can relate to the session, to devices of a dynamic group defined for the session, and/or to components on such devices. How a function is performed in the session and the resulting dynamic group definition can be based on the state information.

At operation 1002, the computer system receives a request for a content output. For example, the computer system previously initiated a function, associated this function with a session identifier, generated session data that include a state of the session, stored the session identifier and the session data in a data store (e.g., as a key-value pair), and sent the session identifier to devices and computing components, as described in connection with FIG. 9. Here, at operation 1002, the computer receives request data from of the device, where this request data includes a session identifier.

At operation 1004, the computer system determines a state of the session. For example, the computer system queries the data store by using the session identifier. The query result can return the session data. The computer system then determines the state of the session from the session data. The determined state can indicate whether the session is ongoing or has already ended, among other possible states.

At operation 1006, the computer system determines whether the session has ended. For example, the session may have ended based on a previous request from a device or a computing component to terminate the execution function or based on a time out period, as described in the dynamic group termination stage 103 of FIG. 1. If the determined state indicates an ended state, the computer system determines that the session has ended and, operation 1008 follows operation 1006; otherwise, operation 1010 follows operation 1006.

At operation 1008, the computer system starts a new session. This operation can be performed in a similar manner as the operation 904 described herein above.

At operation 1010, the computer system determines device information and content information. In an example, the device information can include an identifier of a device to which the content output can be moved or added, a state of this device or of a relevant content component thereon, and/or a capability of the device to output content (e.g., high definition audio/video data processing, or to process content file with a particular file extension). The content information can include content type (e.g., high definition audio/video content, a content file extension, etc.), a license (e.g., a content license or a user account agreement to output the content on identified devices or on a maximum number of devices), an audience suitability rating (e.g., a rating indicating suitable audience of the content output), particular data or type of data in the audio content (e.g., particular words or labels of words to indicate whether audio content includes profane language), and the like. In an example, the device information can be determined from user account information, whereas the content information can be determined from the user account information and/or from the content application.

At operation 1012, the computer system determines whether the request is permitted. If not, operation 1014 follows operation 1012; otherwise, operation 1016 follows operation 1012. This determination can be based on any or a combination of the device information and the content information according to control logic (e.g., one stored by a dynamic group manager). For example, if the device is capable of outputting the content given the device capability and the content type, the request is determined to be permitted. In a further example, if the license allows the content output on the device, the request is permitted. In another example, if the state of the device indicates that the device is idle and/or not already outputting another content, the request is permitted. In yet another example, if the device is associated with a particular audience (e.g., being located in a location accessible to the audience or by being designated as used by this audience, such as a child audience), and if the content is suitable for the audience, the request is permitted.

At operation 1014, the computer system the request is denied. For example, the computer system sends response data to the requesting device or computing component indicating the denial.

At operation 1016, the computer system updates the session data. For example, the computer system includes the device identifier in the session data, indicates that the device or a component on the device has an active state, and/or indicates a configuration of the device in the dynamic group.

At operation 1018, the computer system cause the device to output the content. This operation can be similar to operation 914 described herein above.

Figure 11:
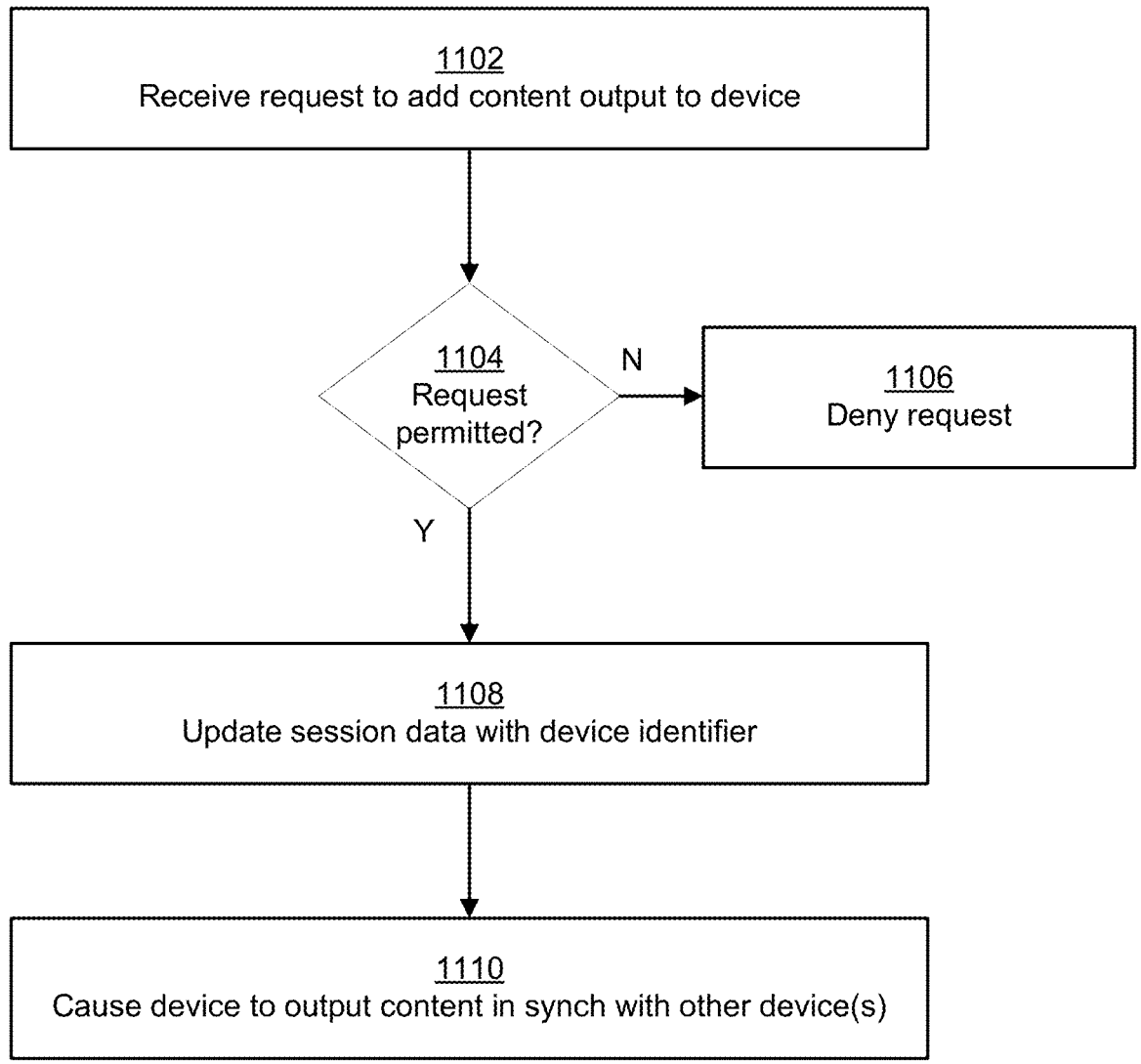
FIG. 11 illustrates an example of a flow for adding a device to a dynamic group of devices in a session, according to embodiments of the present disclosure.

FIG. 11 illustrates an example of a flow for adding a device to a dynamic group of devices in a session, according to embodiments of the present disclosure. The session can be ongoing, but the device may not be part of the dynamic group yet. Adding the device can depend on device information and content information.

At operation 1102, the computer system receives a request to add the content output to the device. For example, request data is received and includes a session identifier and an identifier of the device.

At operation 1104, the computer system determines whether the request is permitted. If not, operation 1106 follows operation 1104; otherwise, operation 1108 follows operation 1104. For example, the computer system determines device information and content information, similar to the ones described in connection with operation 1010 herein above. The device information can be specific to the device to which the content output is to be added. Additionally or alternatively, the device information can be specific to one or more other devices that already belong to the dynamic group. Control logic is applied based on the device information and content information to determine whether the request is permitted. For instance, if the license indicates that the maximum number of devices is not reached by adding the content output to the device, the request is permitted. In another illustration, if the content output is not suitable for potential audience that can be at the location of the device, the request is denied.

At operation 1108, the computer system updates the session data. For example, the computer system includes the device identifier in the session data, indicates that the device or a component on the device has an active state, and/or indicates a configuration of the device in the dynamic group.

At operation 1110, the computer system cause the device to output the content. This operation can be similar to operation 914 described herein above.

Figure 12:
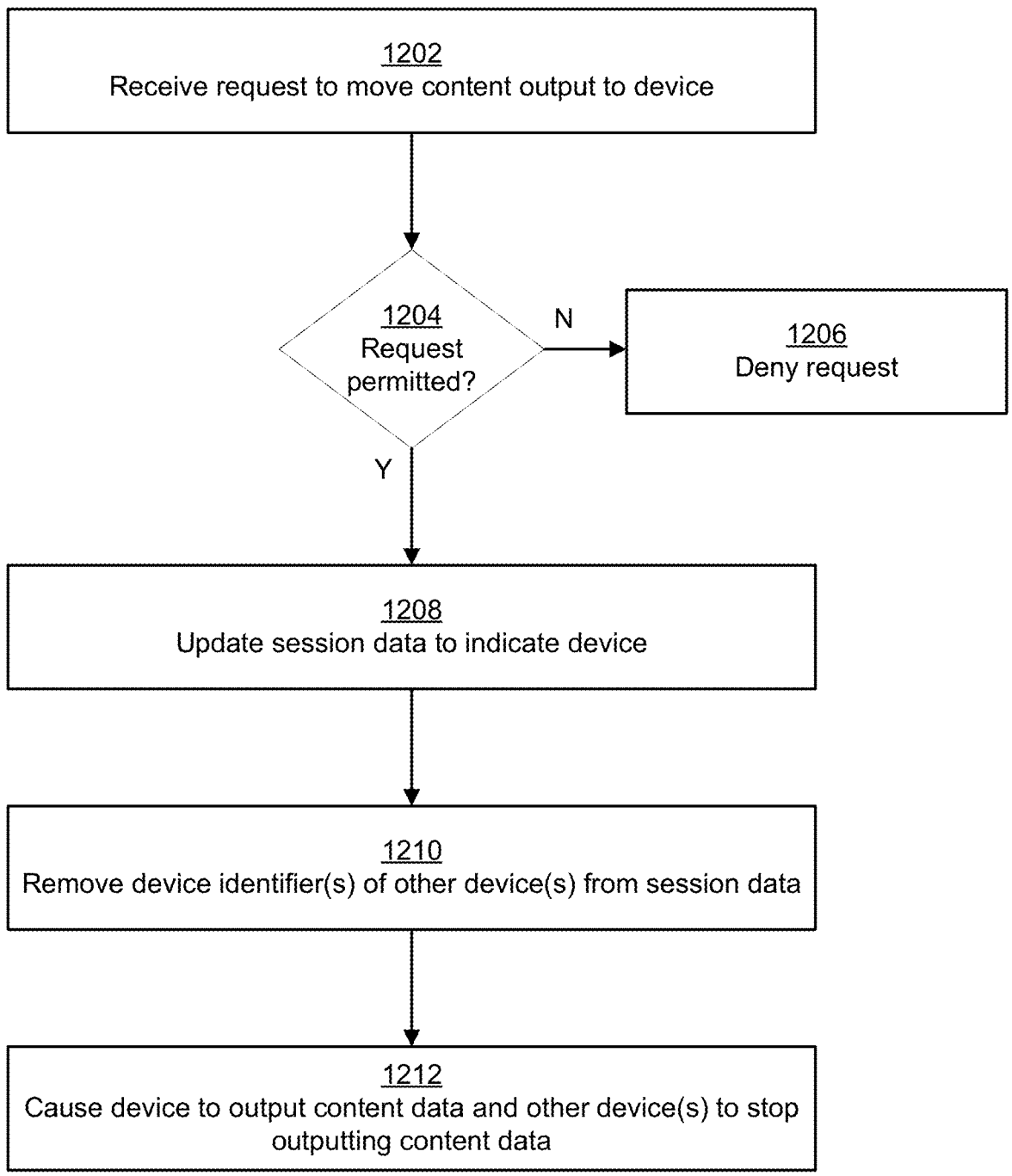
FIG. 12 illustrates an example of a flow for moving content output to a device in a dynamic group of devices in a session, according to embodiments of the present disclosure.

FIG. 12 illustrates an example of a flow for moving content output to a device in a dynamic group of devices in a session, according to embodiments of the present disclosure. The session can be ongoing, but the device may not be part of the dynamic group yet. Moving the content output to the device can depend on device information and content information. At operation 1202, the computer system receives a request to move the content output to the device. For example, request data is received and includes a session identifier and an identifier of the device.

At operation 1204, the computer system determines whether the request is permitted. If not, operation 1206 follows operation 1204; otherwise, operation 1208 follows operation 1204. For example, the computer system determines device information and content information, similar to the ones described in connection with operation 1010 herein above. The device information can be specific to the device to which the content output is moved. Additionally or alternatively, the device information can be specific to one or more other devices that already belong to the dynamic group, such as the device that is being removed from the group. Control logic is applied based on the device information and content information to determine whether the request is permitted. For instance, if the device that is being removed is designated as a parent device (e.g., in a parental control setting) or a source device (e.g., in synchronous content streaming across a large number of devices), the request can be denied.

At operation 1208, the computer system updates the session data to indicate the device to which the content output is moved. For example, the computer system includes the device identifier in the session data, indicates that the device or a component on the device has an active state, and/or indicates a configuration of the device in the dynamic group.

At operation 1210, the computer system removes device identifier(s) of the device(s) being removed from the dynamic group. For example, this update can be to the session, and/or the session data can be updated to update the state of such device(s) to inactive or removed.

At operation 1212, the computer system cause the device to output the content data and the other device(s) to stop outputting the content data. This operation can be similar to operation 914 described herein above.

Figure 13:
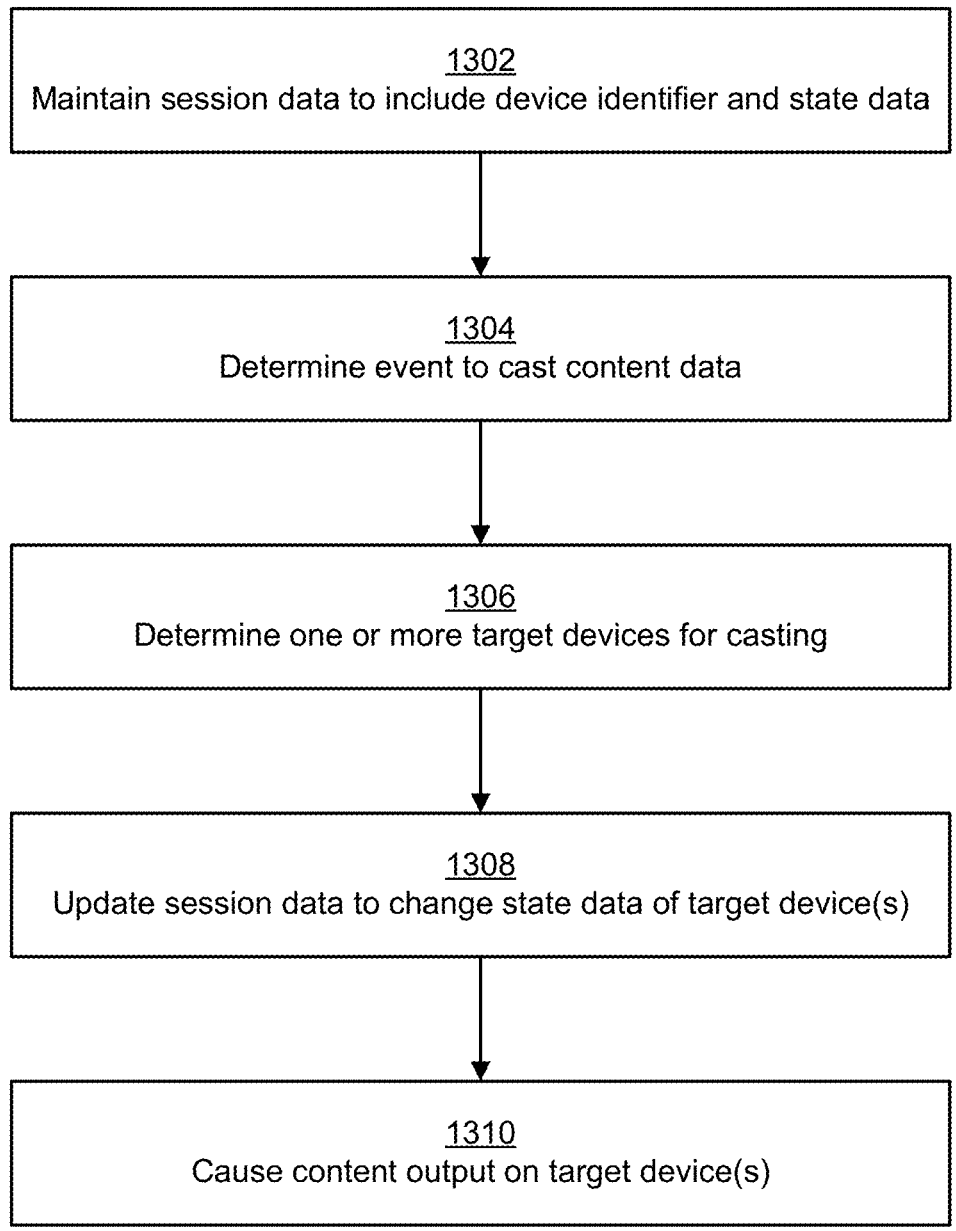
FIG. 13 illustrates an example of a flow for casting content to one or more devices in a dynamic group of devices in a session, according to embodiments of the present disclosure.

FIG. 13 illustrates an example of a flow for casting content to one or more devices in a dynamic group of devices in a session, according to embodiments of the present disclosure. A session identifier can be generated for the session. Prior to the casting, session data can be generated to define the group, where the states of the one or more devices and/or component(s) thereon are set to inactive or idle. Upon determining a trigger to case, the session data can be updated, whereby the states are change to active.

At operation 1302, the computer system maintains session data to include device identifiers and state data. The device identifiers identify the devices that belong to the dynamic group, whereas the state data identifies the state of each of such devices. In an example, a session is ongoing and involves a first device of this group of devices. The computer system determines a set of devices associated with this first device in a user account. The computer system also generates a session identifier for the session and session data based on the set of devices, and associates the session data with the session identifier. The session data can be maintained over time as long as the session is ongoing. For example, at a first point in time, the computer system determines that a second device of the set is idle and, accordingly, includes the corresponding device identifier to the session data. At a second point of time, the computer system determines that the second device is no longer idle and, accordingly, the computer system removes the corresponding device identifier from the session data. In this example, all devices identified in the session data are assumed to have an idle state. In another example, the different devices of the set are identified in the session data. However, their states are updated over time in the session data. In this example, at the first point in time, the second device's state is indicated as idle in the session data, whereas the second point in time, this state is updated to active or busy.

At operation 1304, the computer system determines an event to cast content data from the first device. Different events are possible. In one example, the event corresponds to user input data requesting the casting. In another example, the event corresponds to request data from the content application for the casting. In yet another example, proximity between the first device and one or more of the devices in the set can trigger the event.

At operation 1306, the computer system can determine one or more target device(s) for the casting. The full potential set of device(s) is identified in the session data at the point of time where the event is determined. Here also, control logic can be applied based on device information (which can be maintained in the session data) and/or content information, similar to the ones described in connection with operation 1010 herein above. For example, the casting to the second device is permitted if the second device is associated with an idle state. This casting is also permitted if the maximum number of allowed devices is not exceeded, if the second device is capable of outputting the content data that the first device is currently outputting, and/or if this content data is suitable for audience that can be located in proximity of the second device. If permitted, the second device is a target device.

At operation 1308, the computer system updates the session data to change the state data of the target device(s). For instance, the state of the second device is updated from idle to active. Other updates to the session data are possible, such as being indicating that the first device is a source of the casting and the second device is a destination of the casting.

At operation 1310, the computer system causes the content output on the target device(s). For example, the computer system can send a directive to the first device to start the casting and a directive to the second device to start outputting the content data received from the first device.

Figure 14:
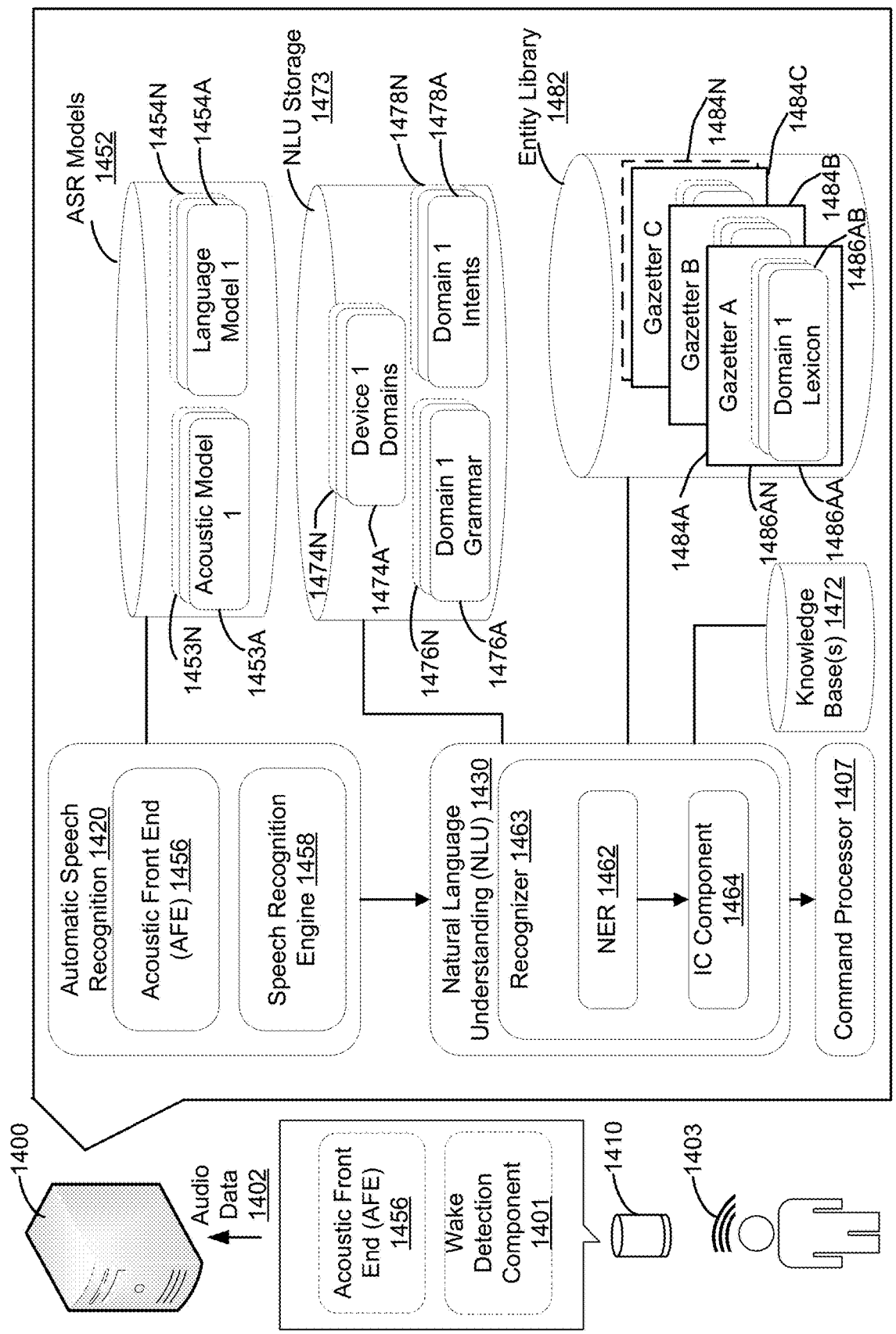
FIG. 14 illustrates an example of components of a device and a computer system, according to embodiments of the present disclosure.

FIG. 14 illustrates a conceptual diagram of how a spoken utterance can be processed, allowing a system to capture and execute commands spoken by a user, such as spoken commands that may follow a wakeword, or trigger expression (e.g., a predefined word or phrase for "waking" a device, causing the device to begin sending audio data to a remote system). The various components illustrated may be located on a same or different physical devices. Communication between various components illustrated in FIG. 14 may occur directly or across a network. An audio capture component, such as a microphone of a device 1410, captures audio 1403 corresponding to a spoken utterance. The device 1410, using a wakeword detection component 1401, then processes audio data corresponding to the audio 1403 to determine if a keyword (such as a wakeword) is detected in the audio data. Following detection of a wakeword, the device 1410 sends audio data 1402 corresponding to the utterance to a computer system 1400 that includes an ASR component 1420.

The audio data 1402 may be output from an optional acoustic front end (AFE) 1456 located on the device prior to transmission. In other instances, the audio data 1402 may be in a different form for processing by a remote AFE 1456, such as the AFE 1456 located with the ASR component 1420 of the computer system 1400.

The wakeword detection component 1401 works in conjunction with other components of the user device, for example a microphone to detect keywords in audio 1403. For example, the device may convert audio 1403 into audio data, and process the audio data with the wakeword detection component 1401 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wakeword detection component 1401 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection component 1401 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 1410 may "wake" and begin transmitting audio data 1402 corresponding to input audio 1403 to the computer system 1400 for speech processing. Audio data corresponding to that audio may be sent to the computer system 1400 for routing to a recipient device or may be sent to the computer system 1400 for speech processing for interpretation of the included speech (either for purposes of enabling voice-communications and/or for purposes of executing a command in the speech). The audio data 1402 may include data corresponding to the wakeword, or the portion of the audio data corresponding to the wakeword may be removed by the local device 1410 prior to sending. Further, a local device may "wake" upon detection of speech/spoken audio above a threshold, as described herein. Upon receipt by the remote computer system 1400, an ASR component 1420 may convert the audio data 1402 into text. The ASR transcribes audio data into text data representing the words of the speech contained in the audio data 1402. The text data may then be used by other components for various purposes, such as executing system commands, inputting data, etc. A spoken utterance in the audio data is input to a processor configured to perform ASR which then interprets the utterance based on the similarity between the utterance and pre-established language models 1454 stored in an ASR model knowledge base (ASR Models Storage 1452). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (e.g., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1453 stored in an ASR Models Storage 1452), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 1420 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1456 and a speech recognition engine 1458. The acoustic front end (AFE) 1456 transforms the audio data from the microphone into data for processing by the speech recognition engine 1458. The speech recognition engine 1458 compares the speech recognition data with acoustic models 1453, language models 1454, and other data models and information for recognizing the speech conveyed in the audio data. The AFE 1456 may reduce noise in the audio data and divide the digitized audio data into frames representing time intervals for which the AFE 1456 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1458 may process the output from the AFE 1456 with reference to information stored in speech/model storage (1252). Alternatively, post front-end processed data (such as feature vectors) may be received by the device executing ASR processing from another source besides the internal AFE. For example, the user device may process audio data into feature vectors (for example using an on-device AFE 1456) and transmit that information to a server across a network for ASR processing. Feature vectors may arrive at the remote computer system 1400 encoded, in which case they may be decoded prior to processing by the processor executing the speech recognition engine 1458.

The speech recognition engine 1458 attempts to match received feature vectors to language phonemes and words as known in the stored acoustic models 1453 and language models 1454. The speech recognition engine 1458 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, add the music to the kitchen," or "Alexa, move the music to the kitchen," or "Alexa, stop the music in the kitchen." The wake detection component may identify the wake word, otherwise described as a trigger expression, "Alexa" in the user utterance and may "wake" based on identifying the wake word. Audio data corresponding to the user utterance may be sent to the remote computer system 1400 where the speech recognition engine 1458 may identify, determine, and/or generate text data corresponding to the user utterance, here "add the music to the kitchen," "move the music to the kitchen," or "stop the music in the kitchen." The speech recognition engine 1458 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1458 to other processing components, which may be local to the device performing ASR and/or distributed across the network(s). For example, ASR results in the form of a single textual representation of the speech, an N-best list including multiple hypotheses and respective scores, lattice, etc. may be sent to the remote computer system 1400, for natural language understanding (NLU) processing, such as conversion of the text into commands for execution, either by the user device, by the remote computer system 1400, or by another device (such as a server running a specific application like a search engine, etc.).

The device performing NLU processing may include various components, including potentially dedicated processor(s), memory, storage, etc. As shown in FIG. 14, an NLU component 1430 may include a recognizer 1463 that includes a named entity recognition (NER) component 1462 which is used to identify portions of query text that correspond to a named entity that may be recognizable by the system. A downstream process called named entity resolution links a text portion to a specific entity known to the system. To perform named entity resolution, the system may utilize gazetteer information (1284a-1284n) stored in entity library storage 1482. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU process takes textual input (such as processed from ASR 1420 based on the utterance input audio 1403) and attempts to make a semantic interpretation of the text. That is, the NLU process determines the meaning behind the text based on the individual words and then implements that meaning. NLU processing interprets a text string to derive an intent or a desired action from the user as well as the pertinent pieces of information in the text that allow a device (e.g., device 1410) to complete that action. For example, if a spoken utterance is processed using ASR and outputs the text "add music to the kitchen" the NLU process may determine that the user intended for the audio being output by a device also be output by another device associated with the identifier of kitchen.

The NLU may process several textual inputs related to the same utterance. For example, if the ASR outputs N text segments (as part of an N-best list), the NLU may process all N outputs to obtain NLU results.

As will be discussed further below, the NLU process may be configured to parse and tag to annotate text as part of NLU processing. For example, for the text "move the music to the kitchen," "move" may be tagged as a command (to output audio on a device) and "kitchen" may be tagged as a specific device to output the audio on instead of the previous device. To correctly perform NLU processing of speech input, an NLU process may be configured to determine a "domain" of the utterance so as to determine and narrow down which services offered by the endpoint device (e.g., remote computer system 1400 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1462 receives a query in the form of ASR results and attempts to identify relevant grammars and lexical information that may be used to construe meaning. To do so, the NLU component may begin by identifying potential domains that may relate to the received query. The NLU storage 1473 includes a database of devices (1274a-1274n) identifying domains associated with specific devices. For example, the user device may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 1463, language model and/or grammar database (1276a-1276n), a particular set of intents/actions (1278a-1278n), and a particular personalized lexicon (1286). Each gazetteer (1284a-1284n) may include domain-indexed lexical information associated with a particular user and/or device. For example, the Gazetteer A (1284a) includes domain-index lexical information 1486aa to 1486an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains ordinarily selected to be the correct result. An intent classification (IC) component 1464 parses the query to determine an intent or intents for each identified domain, where the intent corresponds to the action to be performed that is responsive to the query. Each domain is associated with a database (1278a-1278n) of words linked to intents. For example, a music intent database may link words and phrases such as "add," "move," "remove," "quiet," "volume off," and "mute" to a "mute" intent. A voice-message intent database, meanwhile, may link words and phrases such as "send a message," "send a voice message," "send the following," or the like. The IC component 1464 identifies potential intents for each identified domain by comparing words in the query to the words and phrases in the intents database 1478. In some instances, the determination of an intent by the IC component 1464 is performed using a set of rules or templates that are processed against the incoming text to identify a matching intent.

In order to generate a particular interpreted response, the NER 1462 applies the grammar models and lexical information associated with the respective domain to actually recognize a mention of one or more entities in the text of the query. In this manner, the NER 1462 identifies "slots" or values (e.g., particular words in query text) that may be needed for later command processing. Depending on the complexity of the NER 1462, it may also label each slot with a type of varying levels of specificity (such as noun, place, city, artist name, song name, device identification, audio identification, audio-session queue identification, or the like). Each grammar model 1476 includes the names of entities (e.g., nouns) commonly found in speech about the particular domain (e.g., generic terms), whereas the lexical information 1486 from the gazetteer 1484 is personalized to the user(s) and/or the device. For instance, a grammar model associated with the shopping domain may include a database of words commonly used when people discuss shopping.

The intents identified by the IC component 1464 are linked to domain-specific grammar frameworks (included in 1476) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "add the music to the kitchen" is an identified intent, a grammar (1276) framework or frameworks may correspond to sentence structures such as "add {audio-session queue} to {kitchen}."

For example, the NER component 1462 may parse the query to identify words as subject, object, verb, preposition, etc., based on grammar rules and/or models, prior to recognizing named entities. The identified verb may be used by the IC component 1464 to identify intent, which is then used by the NER component 1462 to identify frameworks. A framework for the intent of "play a song," meanwhile, may specify a list of slots/fields applicable to play the identified "song" and any object modifier (e.g., specifying a music collection from which the song should be accessed) or the like. The NER component 1462 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1462 may search the database of generic words associated with the domain (in the knowledge base 1472). So, for instance, if the query was "add the music to the kitchen," after failing to determine which device corresponds to the identify of "kitchen," the NER component 1462 may search the domain vocabulary for device identifiers associated with the word "kitchen." In the alternative, generic words may be checked before the gazetteer information, or both may be tried, potentially producing two different results.

The output data from the NLU processing (which may include tagged text, commands, etc.) may then be sent to a command processor 1407. The destination command processor 1407 may be determined based on the NLU output. For example, if the NLU output includes a command to send a message, the destination command processor 1407 may be a message sending application, such as one located on the user device or in a message sending appliance, configured to execute a message sending command. If the NLU output includes a search request, the destination command processor 1407 may include a search engine processor, such as one located on a search server, configured to execute a search command. After the appropriate command is generated based on the intent of the user, the command processor 1407 may provide some or all of this information to a text-to-speech (TTS) engine. The TTS engine may then generate an actual audio file for outputting the audio data determined by the command processor 1407 (e.g., "playing in the kitchen," or "music moved to the kitchen"). After generating the file (or "audio data"), the TTS engine may provide this data back to the remote computer system 1400.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component during runtime operations where NLU operations are performed on text (such as text output from an ASR component). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1463. Each recognizer may include various NLU components such as an NER component 1462, IC component 1464 and other components such as an entity resolver, or other components.

For example, a messaging domain recognizer 1463-A (Domain A) may have an NER component 1462-A that identifies what slots (e.g., portions of input text) may correspond to particular words relevant to that domain. The words may correspond to entities such as (for the messaging domain) a recipient. An NER component 1462 may use a machine learning model, such as a domain specific conditional random field (CRF) to both identify the portions corresponding to an entity as well as identify what type of entity corresponds to the text portion. The messaging domain recognizer 1463-A may also have its own intent classification (IC) component 1464-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device may include a model training component. The model training component may be used to train the classifier(s)/machine learning models discussed above.

As noted above, multiple devices may be employed in a single speech processing system. In such a multi-device system, each of the devices may include different components for performing different aspects of the speech processing. The multiple devices may include overlapping components. The components of the user device and the remote computer system 1400, as illustrated herein are exemplary, and may be located in a stand-alone device or may be included, in whole or in part, as a component of a larger device or system, may be distributed across a network or multiple devices connected by a network, etc.

Figure 15:
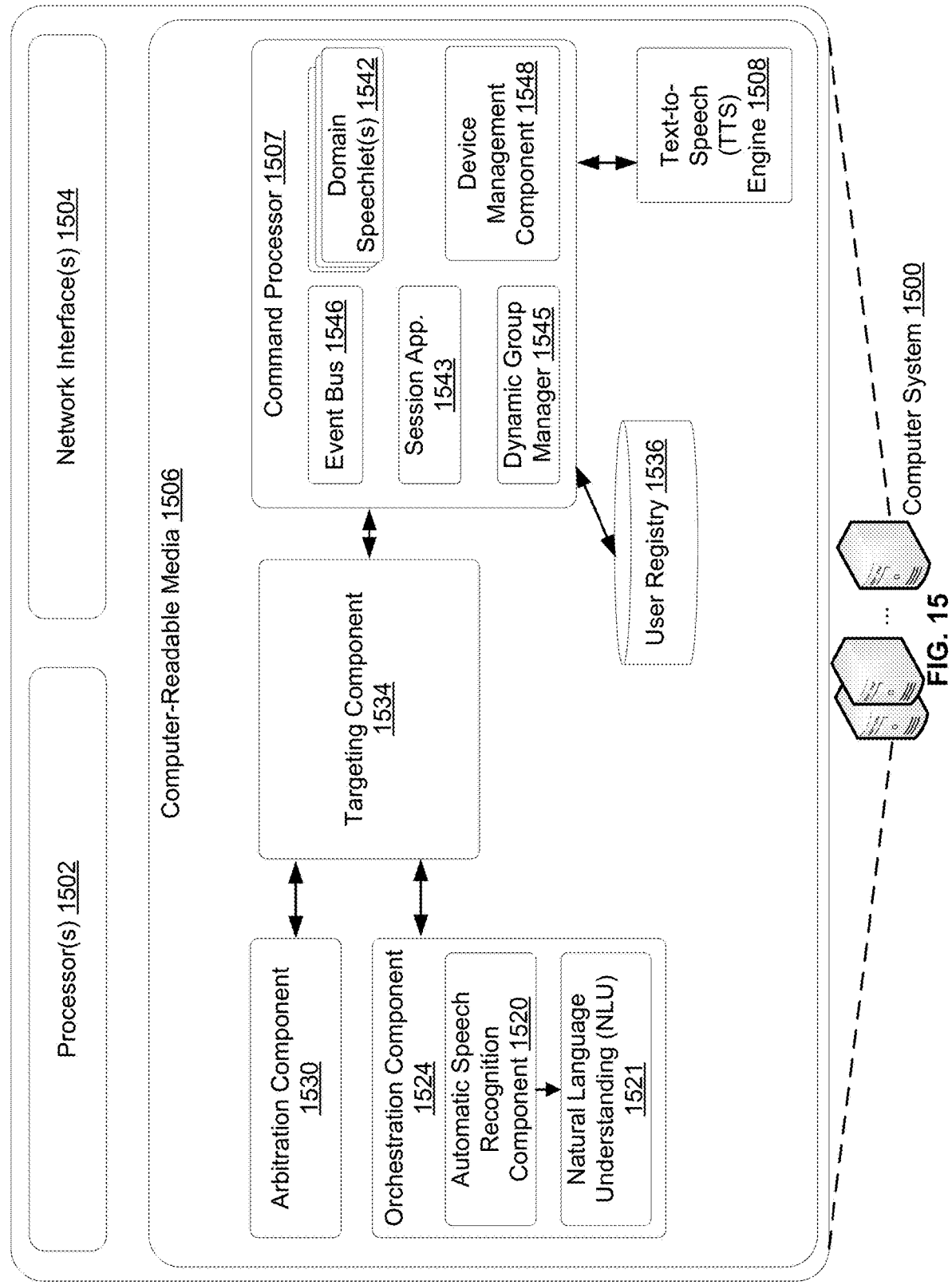
FIG. 15 illustrates an example of components of a computer system, according to embodiments of the present disclosure.

FIG. 15 illustrates a conceptual diagram of components of a computer system 1500 associating audio output commands with multiple devices, including a command processor 1507 configured to generate a command that the selected voice-enabled device uses to respond to a user utterance. As used with respect to FIG. 15, a voice-enabled device may include a device, such as any of the devices described herein above. As illustrated in FIG. 15, the computer system 1500, including the orchestration component 1524 and a speech processing component comprising an ASR component 1520 and an NLU component 1521, may be coupled to a targeting component 1534 and provide the targeting component 1534 with the intent determined to be expressed in the user utterance. Further, the arbitration component 1530 may provide the ranked list of devices to the targeting component 1534, as well as device indicators (e.g., IP addresses, devices names, etc.) for one or more of the voice-enabled devices in the ranked list of devices. The targeting component 1534 may then perform techniques to determine a target device (e.g., a device to perform the requested operation), and provide various data to the command processor 1507. For instance, the targeting component 1534 may provide the command processor 1507 with various device identifiers of the voice-enabled devices, the determined target device, the determined intent and/or command, etc. By way of example, the targeting component 1534 may determine which devices to add to a grouping of device, which devices to remove from a grouping of devices, and/or which devices to move an audio-session to.

The command processor 1507 and/or NLU component 1521 may determine a domain based on the intent and, based on this determination, route the request corresponding to the audio data to the appropriate domain speechlet, such as the illustrated domain speechlets 1542. The domain speechlet 1542 may comprise any type of device or group of devices (e.g., hardware device, virtual devices or partitions, server, etc.), and may receive the text data and/or an intent associated with the audio signals and may determine how to respond to the request. For instance, the intent for a command "add the music to the kitchen" may be routed to a music domain speechlet 1542, which controls devices, such as speakers, connected to the voice-enabled devices. The music domain speechlet 1542 may determine a command to generate based on the intent of the user to output audio on a device associated with the kitchen identifier as when as continuing to output the audio on another device that is currently outputting the audio. Additionally, the music domain speechlet 1542 may determine additional content, such as audio data, to be output by one of the voice-enabled devices, such as "kitchen has been added to your audio session."

Various types of domain speechlets 1542 may be used to determine which devices to send commands to and/or to use in response to a user utterance, as well as the appropriate response and potential additional content (e.g., audio data). For example, the domain speechlets 1542 may include a third party skills domain speechlet 1542, which may handle intents associated with gaming, productivity, etc., a music domain speechlet 1542, which may handle intents associated with music play requests, and/or an information domain speechlet 1542, which may handle requests for information associated, for example, with the status of a particular device and/or content being utilized and/or output by a particular device and/or group of devices.

After the domain speechlet 1542 generates the appropriate command, which may be described herein as directive data, based on the intent of the user, and/or provides additional content, such as audio data, to be output by one of the voice-enabled devices, the domain speechlet 1542 may provide this information back to the computer system 1500, which in turns provides some or all of this information to a text-to-speech (TTS) engine 1508. The TTS engine 1508 then generates an actual audio file for outputting the second audio data determined by the domain speechlet 1542. After generating the file (or "audio data"), the TTS engine 142 may provide this data back to the computer system 1500.

The computer system 1500 may then publish (e.g., write) some or all of this information to an event bus 1546. That is, the computer system 1500 may provide information regarding the initial request (e.g., the speech, the text, the domain/intent, etc.), the response to be provided to the voice-enabled device, or any other information pertinent to the interaction between the voice-enabled device and the computer system 1500 to the event bus 1546.

Within the computer system 1500, one or more components or services, including a session application 1543 and a dynamic group manager 1545, may subscribe to the event bus 1546 so as to receive information regarding interactions between user devices and the computer system 1500. In the illustrated example, for instance, the device management component 1548 may subscribe to the event bus 1546 and, thus, may monitor information regarding these interactions. In some examples, monitoring information in the event bus 1546 may comprise communications between various components of the computer system 1500. For example, the targeting component 1534 may monitor the event bus 1546 to identify device state data for voice-enabled devices. In some examples, the event bus 1546 may "push" or send indications of events and/or device state data to the targeting component 1534. Additionally, or alternatively, the event bus 1546 may be "pulled" where the targeting component 1534 sends requests to the event bus 1546 to provide an indication of device state data for a voice-enabled device. The event bus 1546 may store indications of the device states for the devices, such as in a database (e.g., user registry 1536), and using the stored indications of the device states, send the device state data for voice-enabled devices to the targeting component 1534. Thus, to identify device state data for a device, the targeting component 1534 may send a request to the event bus 1546 (e.g., event component) to provide an indication of the device state data associated with a device, and receive, from the event bus 1546, the device state data that was requested.

The device management component 1548 functions to monitor information published to the event bus 1546 and identify events that may trigger action. For instance, the device management component 1548 may identify (e.g., via filtering) those events that: (i) come from voice-enabled devices that are associated with secondary device(s) (e.g., have secondary devices in their environments such as televisions, personal computing devices, etc.), and (ii) are associated with supplemental content (e.g., image data, video data, etc.). The device management component 1548 may reference the user registry 1536 to determine which voice-enabled devices are associated with secondary devices, as well as determine device types, states, and other capabilities of these secondary devices. For instance, the device management component 1548 may determine, from the information published to the event bus 1546, an identifier associated with the voice-enabled device making the corresponding request or the voice-enabled device selected to respond to or act upon the user utterance. The device management component 1548 may use this identifier to identify, from the user registry 1536, a user account associated with the voice-enabled device. The device management component 1548 may also determine whether any secondary devices have been registered with the identified user account, as well as capabilities of any such secondary devices, such as how the secondary devices are configured to communicate (e.g., via WiFi, short-range wireless connections, etc.), the type of content the devices are able to output (e.g., audio, video, still images, flashing lights, etc.), and the like. For example, the secondary devices may include speakers that may wirelessly communicate with the voice-enabled device and/or one or more other secondary devices, such as personal devices.

The device management component 1548 may determine whether a particular event identified is associated with supplemental content. That is, the device management component 1548 may write, to a datastore, indications of which types of events and/or which primary content or responses are associated with supplemental content. In some instances, the computer system 1500 may provide access to third-party developers to allow the developers to register supplemental content for output on secondary devices for particular events and/or primary content. For example, if a voice-enabled device is to output that the weather will include thunder and lightning, the device management component 1548 may store an indication of supplemental content such as thunder sounds, pictures/animations of lightning and the like. In another example, if a voice-enabled device is outputting information about a particular fact (e.g., "a blue whale is the largest mammal on earth . . . "), then a secondary device, such as television, may be configured to provide supplemental content such as a video or picture of a blue whale. In another example, if a voice-enabled device is outputting audio, then a second device, such as a speaker, may be configured to also output the audio based at least in part on a user utterance representing a request to add the secondary device to the audio session. In these and other examples, the device management component 1548 may store an association between the primary response or content (e.g., outputting of information regarding the world's largest mammal) and corresponding supplemental content (e.g., the audio data, image data, or the like). In some instances, the device management component 1548 may also indicate which types of secondary devices are to output which supplemental content. For instance, in the instant example, the device management component 1548 may store an indication that secondary devices of a class type "tablet" are to output a picture of a blue whale. In these and other instances, meanwhile, the device management component 1548 may store the supplemental content in association with secondary-device capabilities (e.g., devices with speakers output the audio commentary, devices with screens output the image, etc.).

The device management component 1548 may also determine how to transmit response and/or supplement content (and/or information acquiring the content) to the voice-enabled devices and/or the secondary devices. To make this determination, the device management component 1548 may determine a device type of the voice-enabled devices and/or secondary devices, capabilities of the device(s), or the like, potentially as stored in the user registry 1536. In some instances, the device management component 1548 may determine that a particular device is able to communicate directly with the computer system 1500 (e.g., over WiFi) and, thus, the device management component 1548 may provide the response and/or content directly over a network to the secondary device (potentially via the computer system 1500). In another example, the device management component 1548 may determine that a particular secondary device is unable to communicate directly with the computer system 1500, but instead is configured to communicate with a voice-enabled device in its environment over short-range wireless networks. As such, the device management component 1548 may provide the supplement content (or information) to the computer system 1500, which in turn may send this to the voice-enabled device, which may send the information over a short-range network to the secondary device.

The computer-readable media 152 may further include the user registry 1536 that includes data regarding user profiles as described herein. The user registry 1536 may be located part of, or proximate to, the computer system 1500, or may otherwise be in communication with various components, for example over the network 118. The user registry 1536 may include a variety of information related to individual users, accounts, etc. that interact with the voice-enabled devices, and the computer system 1500. For illustration, the user registry 1536 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry 1536 may store indications of associations between various voice-enabled devices and/ or secondary device, such as virtual clusters of devices, states of devices, and associations between devices and audio-session queues. The user registry 1536 may represent clusters of devices and/or as single devices that can receive commands and disperse the commands to each device and/or in the cluster. In some examples, the virtual cluster of devices may be represented as a single device which is determined as being capable, or not capable (e.g., offline), of performing a command in a user utterance. A virtual cluster of devices may generally correspond to a stored grouping of devices, or a stored association between a group of devices.

In some examples, the device state for devices associated with a user account may indicate a current state of the device. In this way, the command processor 1507 and/or the domain speechlets 1542 may determine, based on the stored device states in the user registry 1536, a current device state of the voice-enabled devices. Rather than receiving device states for the voice-enabled devices, in metadata, the device states may already have been determined or received and stored in the user registry 1536. Further, the user registry 1536 may provide indications of various permission levels depending on the user. As an example, the computer system 1500 may perform speaker recognition on audio signals to determine an identity of the speaker. If the speaker is a child, for instance, the child profile may have permission restrictions where they are unable to request audio to be output via certain devices and/or to output certain audio on one or more of the devices, for example. Conversely, a parent profile may be able to direct output of audio without restrictions. In some examples, to determine the device state, the event bus 1546 may publish different events which indicate device states to various entities or components that subscribe to the event bus 1546. For instance, if an event of "play music" occurs for a voice-enabled device, the event bus 1546 may publish the indication of this event, and thus the device state of outputting audio may be determined for the voice-enabled device. Thus, various components, such as the targeting component 1534, may be provided with indications of the various device states via the event bus 1546. The event bus 1546 may further store and/or update device states for the voice-enabled devices in the user registry 1536. The components of the computer system 1500 may query the user registry 1536 to determine device states. A particular user profile may include a variety of data that may be used by the computer system 1500. For example, a user profile may include information about what voice-enabled devices are associated with the user and/or user profile. The user profile may further indicate an IP address for each of the devices associated with the user and/or user profile, user IDs for the devices, indications of the types of devices, and current device states for the devices.

Figure 16:
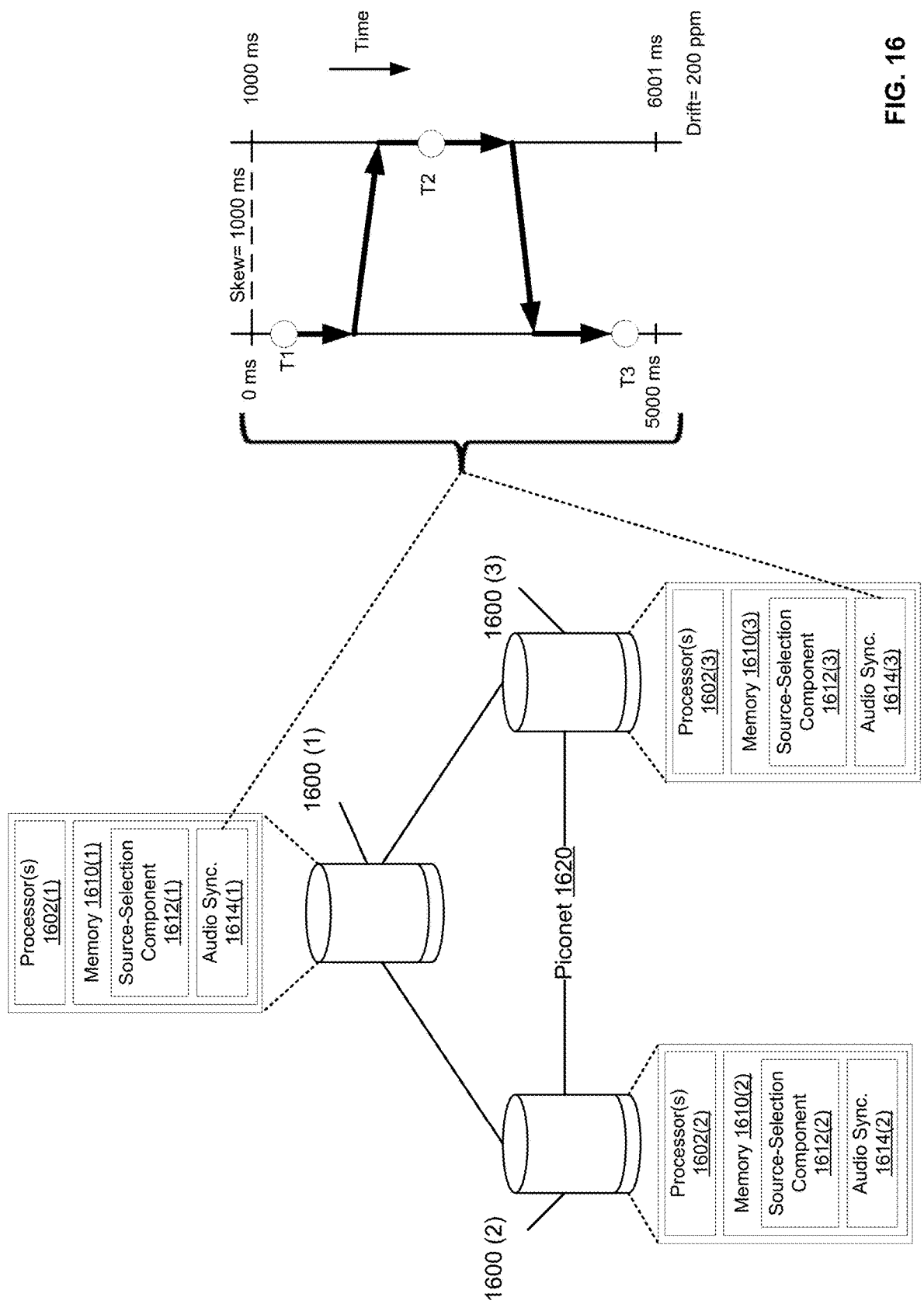
FIG. 16 illustrates a schematic diagram of an example environment for selecting one of multiple devices as a source device for, for example, synchronized music playback according to embodiments of the present disclosure.

FIG. 16 illustrates a schematic diagram of an example environment for selecting one of multiple devices as a source device for, for example, synchronized music playback. As illustrated, devices include one or more processors 1602(1), 1602(2), and 1602(3). As noted above, in some instances each device 1600(1)-(3) may include a single radio unit to communicate over multiple protocols (e.g., BLUETOOTH and BLE), two or more radio units to communicate over two or more protocols, or the like. In some instances, the devices include any other number of radios, including instances where the devices comprise a single radio configured to communicate over two or more different protocols.

In addition to the above, the devices 1600(1)-(3) may include respective memory (or "computer-readable media") 1610(1), 1610(2), and 1610(3), which may store respective instances of a source-selection component 1612(1), 1612(2), and 1612(3). The source-selection components 1612(1)-(3) may generate messages (e.g., communication-strength messages, etc.) and one or more maps (e.g., communication-strength maps, etc.), and may be used to select/determine the source device. Further, the source-selection components 1612(1)-(3) may send and/or receive the source-selection messages and store an indication of the selected source and the amount of time for which the selected device is to be act as the source. In a particular example, a source-selection message is received from a computer system that stores session data, where the session data indicates that a particular device 1600(1)-(3) is to be selected as the source. The source-selection components 1612(1)-(3) may also set a timer for determining the amount of time for which the selected device is to act as a source, or may otherwise determine when the time for the device to act as the source has elapsed.

In some instances, messages sent by each device indicate a current state of the device and whether the device is associated with a session (e.g., by including a session identifier in the message), a current connection strength to the WLAN of the device, information identifying the WLAN, information identifying the device, and/or the like. With this information, each source-selection component 1612(1)-(3) may determine the device that is to be selected as the source device. In some instances, the source-selection components 1612(1)-(3) may implement an algorithm that selects the device that is associated with a session of a function (e.g., a music playback session) and/or the device that was first associated with the function (e.g., in session data) as the source device. In other instances, the components 1612(1)-(3) may select the device having the highest connection strength as the source device. In still other instances, each component is configured to implement a cost function that selects the source device based on one or more weighted factors, such as current association with the session, connection strengths, and so forth. In other examples, one of the devices may be designated by the user as the source and/or one of the device may include additional components and/or functionality and may be designed as the source device based at least in part on those additional components and/or functionality.

The devices 1600(1)-(3) and a primary device may couple with one another over a short-range wireless network and thus collectively forming a piconet 1620. In the illustrated example, each of the devices comprise devices configured to communicate both with one another over a short-range connection as well as over a data network (e.g., a public network, such as the Internet, that may connect these devices to a computer system). In some instances, meanwhile, while some of the devices 1600(1)-(3) may be configured to communicate over a short-range wireless network and over the data network, the other devices 1600(1)-(3) may be configured to communicate over multiple short-range wireless protocols (e.g., BLUETOOTH, BLE, etc.) while being incapable of communicating over the data network. In these instances, the devices 1600(1)-(3) may select a source device that communicates with the other devices over a low-power protocol while communicating with the source device over a higher-power protocol. The source device may then communicate these messages over the data network.

Additionally, one or more source-selection message may be sent between devices in response to determining that a device it is to act as the source device. For instance, one or more of the non-source devices may send a message and/or a remote system may send a message. The source-selection message may indicate the device identification (DID) of the selected source device, in this example, the DID of the first device 1600(1), as well as the amount of time for which the selected device is to act as the source device. In examples, this amount of time may be preconfigured and constant, while in other instances it may vary depending on associations between the devices and an audio-session queue, the number of devices in the piconet 1620, or the like. In response to receiving the source-selection message, the non-source devices may store an indication of the DID of the source device as well as the amount of time for which the selected accessory device is to act as the source device. The devices may then again send out messages after expiration of the amount of time or just prior to expiration of this amount of time to determine if the source communication device should change.

In an example, the computer system (e.g., the computer system 110 of FIG. 1) causes one of the devices 1600(1)-(3) a device of multiple associated devices to act as a source device. For example, the computer system 110 can implement a source selection component to select the source device in a similar way as described herein above. The DID of the selected device can be included in session data associated with a session identifier of a session. A selection message can be sent to at least the source device with a directive to output content (e.g., music audio) and synchronize this output at the other devices not designated as a source device. The source device may control the other devices. For example, the first device may queue data (e.g., audio data), and instruct over the piconet 1620 the other devices to queue the data and present the queued data in a time synchronous manner with the audio output at the source device.

The devices 1600(1)-(3) can be configured for synchronized music playback such that they can be used to play audio (e.g., music) at the same time. The devices may perform time synchronization so that clocks are synchronized and audio may be output at the correct time across multiple devices. This synchronization can be controlled by an audio synchronizer 1614(1)-(3) of each device.

For example, a first clock of the device 1600(1) may be different from a second clock of the device 1600(3) by a time offset (e.g., skew) and a frequency offset (e.g., drift). Thus, in order to synchronize the clocks, the devices 1600(1) and 1600(3) need to compensate for the skew and the drift.

One method for determining skew and drift is the Precision Time Protocol (PTP), which performs timestamp exchanges when sending a first packet from a first device to a second device and when sending a second packet from the second device back to the first device. By assuming that the transit times are identical, the timestamp exchanges may be used to determine the skew and the drift between the clocks. However, variable delays result in variations in the transit times, rendering this technique unreliable and not always accurate. For example, variable delays inherent in a wireless local area network (WLAN) (such as WiFi) range from milliseconds to seconds based on buffers in the access point, preventing the PTP algorithm from converging due to jitter.

A more precise method that can be implemented by the audio synchronizers 1614 (1)-(3) for synchronization between the devices 1600(1)-(3) may separate timestamp exchanges, select timestamp exchanges corresponding to fixed delays and determine skew and drift based on the selected timestamp exchanges. Thus, instead of using combined timestamp exchanges at a specific time to determine the skew and/or drift, this method may determine the skew and/or drift based on an aggregate of multiple timestamp exchanges (e.g., over a period of time) in order to account for the variable delays. For example, the method may identify first control points corresponding to fastest packets sent from a first device to a second device (e.g., using a first convex hull enveloping first timestamp exchanges) and identify second control points corresponding to fastest packets from the second device to the first device (e.g., using a second convex hull enveloping second timestamp exchanges). The method may determine the skew and the drift based on the first control points and the second control points. For example, the method may determine the skew based on a midpoint between the first convex hull and the second convex hull and may determine the drift based on a slope of a midline between the first convex hull and the second convex hull that corresponds to the midpoint. For example, the method may select first points along the first convex hull and second points along the second convex hull and may compare the first points to the second points to determine the skew and drift.

Additionally or alternatively, the method may determine changes in network parameters and may recalculate the skew and drift based on additional data points. In some examples, a device may include multiple audio synchronizers and may associate each audio synchronizer with a separate connection. For example, when switching from a first connection to a second connection, the device may switch from a first audio synchronizer to a second audio synchronizer and may determine the skew and drift using the second audio synchronizer.

Time synchronization between devices enables the devices 1600(1)-(3) to share a common notion of time. For example, a first clock included in the device 1600(1) may be different than a second clock included in the device 1600(3), with a potential skew (e.g., time offset) and drift (e.g., frequency offset) between the clocks. In order to share a common notion of time, the device 1600(1) and/or the device 1600(3) need to determine the skew and drift between them and compensate for the skew and drift. Thus, the devices 1600(1)-(3) may convert the common notion of time to a local clock and add or subtract samples (e.g., clock ticks, time values, etc.) to synchronize. For example, the device 1600(1) may compensate for the skew by adding or subtracting a time value corresponding to the skew. Similarly, the device 1600(1) may compensate for the drift by adding or subtracting to the skew estimate over time. For example, a drift of 200 parts per million (ppm) corresponds to an additional 1 ms delay every 5000 ms. Thus, the skew may start at a first value (e.g., 2000 ms) and may increase every 5000 ms to a second value (e.g., 2001 ms).

By having a common notion of time, the devices 1600 (1)-(3) may translate timestamps from the first clock to the second clock, enabling sophisticated synchronization between the devices 1600(1)-(3). For example, the devices 1600(1)-(3) may generate audio output at the same time, enabling multi-room audio or left-right stereo audio between devices 1600 (1)-(3) connected via wireless networks.

When multiple devices 1600(1)-(3) are connected to each other, they may select one device as a source clock and the remaining devices may synchronize with the source clock. For example, if four devices 1600(1)-(3) are synchronized, the devices 1600(1)-(3) may select the device 1600(1) as the source clock and may synchronize between the device 1600(1) and the device 1600(2), between the device 1600(1) and the device 1600(3).

In some examples, the devices 1600(1)-(3) may select the source clock having the highest accuracy, which corresponds to the smallest potential drift. For example, a first clock may have an accuracy within +/−20 ppm, whereas a second clock may have an accuracy+/−2 ppm. To increase the accuracy of the clocks, the second clock may be selected as the source clock as it has the highest accuracy and therefore drift between the clocks will be caught more quickly.

In an example, the device 1600(1) may generate first data points corresponding to a first timestamp exchange (e.g., in a first direction) and may generate second data points corresponding to a second timestamp exchange (e.g., in a second direction). For example, the first timestamp exchange may correspond to packets sent from the device 1600(1) to the device 1600(3), with the first data points corresponding to a difference between a first timestamp taken by the device 1600(1) and a second timestamp taken by the device 1600(3). Similarly, the second timestamp exchange may correspond to packets sent from the device 1600(3) to the device 1600(1), with the second data points corresponding to a difference between a third timestamp taken by the device 1600(3) and a fourth timestamp taken by the device 1600(1). Due to variable delays in the piconet 1620, the first data points and the second data points may vary drastically, with some data points corresponding to a short transit time and other data points corresponding to a long transit time. If the skew is positive, the first data points will be higher than the second data points, whereas if the skew is negative, the first data points will be lower than the second data points.

The device 1600(1) may optionally determine a first convex hull based on the first data points and may optionally determine a second convex hull based on the second data points. For example, the first convex hull may enclose the first data points, such that the first convex hull is the smallest convex set that contains the first data points, which may be visualized as the shape enclosed by a rubber band stretched around the first data points. Similarly, the second convex hull may enclose the second data points, such that the second convex hull is the smallest convex set that contains the second data points, which may be visualized as the shape enclosed by a rubber band stretched around the second data points. The first convex hull and the second convex hull may be parallel, with a gap in the middle caused by the transit times between the device 1600(1) and the device 1600(3).

The device 1600(1) may determine first control points from the first data points, the first control points corresponding to the shortest transit times from the device 1600(1) to the device 1600(3) (e.g., local extrema, whether maxima or minima). For example, the first control points may include a portion of the first data points along the first convex hull. The device 1600(1) may determine second control points from the second data points, the second control points corresponding to the shortest transit times from the device 1600(3) to the device 1600(1) (e.g., local extrema, whether maxima or minima). For example, the second control points may include a portion of the second data points along the second convex hull. The control points correspond to the short transit times that therefore approximate ideal transit times that do not include a variable delay. As the control points correspond to the short transit times, they are along the gap between the first data points and the second data points and may be used to determine the skew between the first clock and the second clock and a corresponding drift.

In some examples, the first control points may correspond to minima (e.g., a portion of the first data points having a local minimum value), such that the first convex hull corresponds to a bottom edge of the first data points, and the second control points may correspond to maxima (e.g., a portion of the second data points having a local maximum value), such that the second convex hull corresponds to a top edge of the second data points. However, the disclosure is not limited thereto and in other examples, the first control points may correspond to maxima (e.g., a portion of the first data points having a maximum value), such that the first convex hull corresponds to a top edge of the first data points, and the second control points may correspond to minima (e.g., a portion of the second data points having a minimum value), such that the second convex hull corresponds to a bottom edge of the second data points. Thus, the control points may correspond to extrema and the first convex hull and the second convex hull may be approximately parallel and separated by a gap that corresponds to the transit times.

In some examples, the control points are determined based on the convex hulls. One of the benefits of determining the convex hulls is that the convex hulls efficiently identify data points along the gap between the first data points and the second data points, as the convex hull algorithm takes into account data points over a relatively long period of time. In addition, as data points "expire" (e.g., the device 1600(1) removes and/or ignores data points older than a fixed duration, such as an hour), the convex hulls maintain an edge corresponding to the expired data point. For example, if the first convex hull extends from a first data point to a second data point and the first data point expires, the first convex hull may approximate the first data point along a vector between the first data point and the second data point. Thus, as time progresses, the approximated data point moves along the vector until the second data point expires, taking into account the first data point despite the first data point expiring. This enables the estimated skew and/or estimated drift to converge to a stable value faster than other techniques.

Additionally or alternatively, the control points that correspond to the shortest transit times (e.g., local maxima or minima) may be determined using other techniques known to one of skill in the art without departing from the disclosure. For example, the device 1600(1) may determine the control points using a moving minima filter (and/or maxima filter), such as by selecting the minimum/maximum values of the first data points and the second data points for a fixed window of time (e.g., one second, ten seconds, etc.). While the moving minima/maxima filters may identify the control points (e.g., local extrema), the moving minima/maxima filters may provide coarser granularity than the convex hulls as the minima/maxima filters discard data points outside of the fixed window of time.

Regardless of the used technique, the control points corresponding to shortest transit times are identified using an aggregate of timestamp exchanges over a period of time instead of a combined timestamp exchange at a specific point in time. Thus, the method described herein is not limited to a single technique and may determine the control points using one or more techniques without departing from the disclosure. For ease of explanation, the following description will continue to refer to determining the control points by determining convex hulls, as the convex hulls effectively illustrate that the control points correspond to the extrema (e.g., maxima and minima of the data points). However, the disclosure is not limited thereto and determining the convex hulls may be broadly considered a filtering process used to identify a portion of the data points as the control points.

The device 1600(1) may determine (skew between the first clock and the second clock and may determine drift between the first clock and the second clock. Assuming that the shortest transit time from the device 1600(1) to the device 1600(3) is identical to the shortest transit time from the device 1600(3) to the device 1600(1), the device 1600(1) may estimate the skew by determining midpoint(s) between the first control points and the second control points (e.g., a midpoint between a control point along the first convex hull and a point along the second convex hull, or vice versa). For example, the device 1600(1) may determine vectors between the portion of the first data points along the first convex hull and the portion of the second data points along the second convex hull. The device 1600(1) may determine vector lengths corresponding to the vectors and may select the shortest vector length. The device 1600(1) may estimate the skew based on a midpoint of the selected vector and may estimate the drift based on a slope between the portion of the first data points and/or the portion of the second data points in proximity to the vector.

After determining the skew and the drift, the device 1600(1) may compensate for the skew and the drift. For example, the device 1600(1) may synchronize the first clock to the second clock such that they share a common notion of time. In addition, if the second clock drifts relative to the first clock, the device 1600(1) may add samples to the first clock to compensate for the drift.

The top right portion of FIG. 16 illustrates timestamp exchanges using PTP. PTP algorithms may use timestamp exchanges to synchronize multiple clocks over a network. For example, PTP algorithms exchange timestamps between two devices and determine skew (e.g., time offset between clock times) and drift (e.g., frequency offset between the clocks) between the devices based on the timestamp exchange.

As illustrated, a first clock associated with the device 1600(1) may have a skew of 1000 ms and a drift of 200 part per million (ppm) relative to a second clock associated with the device 1600(3). Thus, at a first time (e.g., 0 ms), the first clock may correspond to a first value (e.g., 0 ms) whereas the second clock may correspond to a second value (e.g., 1000 ms). In addition to the time offset between the first clock and the second clock, a first frequency of the first clock may differ from a second frequency of the second clock by a small amount, such that the second clock may increase at a slightly faster rate. For example, the drift of 200 ppm means that every 5000 ms, the second click will drift by 1 ms relative to the first clock.

The device 1600(1) may generate a first timestamp T1 at a first time and may send a first data packet including the first timestamp T1 to the device 1600(3). The device 1600(3) may receive the first data packet, generate a second timestamp T2 at a second time and may send a second data packet including the first timestamp T1 and/or the second timestamp T2 to the device 1600(1). The device 1600(1) may receive the second data packet, generate a third timestamp T3 at a third time and compare the timestamps (e.g., T1, T2 and T3) to determine the drift and the skew. For example, the first time may correspond to a first clock time (e.g., 0 ms) for the device 1600(1) and a second clock time (e.g., 1000 ms) for the device 1600(3). Similarly, the second time may correspond to a third clock time (e.g., 2500 ms) for the device 1600(1) and a fourth clock time (e.g., 3500 ms) for the device 1600(3), and the third time may correspond to a fifth clock time (e.g., 5000 ms) for the device 1600(1) and a sixth clock time (e.g., 6001 ms) for the device 1600(3). Thus, the first timestamp T1 has a value of 0 ms, the second timestamp T2 has a value of 3500 ms and the third timestamp T3 has a value of 5000 ms.

To determine the skew, the PTP algorithm may treat the exchange of timestamps as a single exchange and assume that a first transit time from the device 1600(1) to the device 1600(3) is identical to a second transit time from the device 1600(3) to the device 1600(1). As the first direction exchange (e.g., T2−T1) includes the first transit time and a positive skew and the second direction exchange (e.g., T3−T2) includes the second transit time and a negative skew, the positive skew cancels the negative skew and an average of the two exchanges corresponds to the average transit time. Therefore, the device 1600(1) may determine the average transit time using an equation such as $t_{Avg}=(1/2)((T2-T1)+(T3-T2))$, which in this case is equal to Transit$_{Avg}=(1/2)((3500-0)+(5000-3500))=2500$ ms.

To determine the skew, the device 1600(1) may determine the differences between the timestamps relative to a fixed clock (e.g., either the first clock or the second clock). Using this technique, the first direction exchange (e.g., T2−T1) includes a positive skew and a positive first transit time while the second direction exchange (e.g., T2−T3) includes a positive skew and a negative second transit time, such that the first transit time cancels the negative second transit time and an average of the two exchanges corresponds to the skew. Therefore, the device 1600(1) may determine the skew using an equation such as Skew=$(1/2)((T2-T1)+(T3-T2))$, which in this case is equal to Skew=$(1/2)((3500-0)+(3500-5000))=1000$ ms.

As further illustrated, the third time corresponds to the fifth clock time (e.g., 5000 ms) for the device 1600(1) and the sixth clock time (e.g., 6001 ms) for the device 1600(3), which corresponds to a drift of 200 ppm. Using the timestamps, the device 1600(1) may determine the drift between the first clock and the second clock. To illustrate an example, the fourth clock time may actually be 3500.5 ms and the device 1600(1) may determine the drift after compensating for the skew and the transit time. For example, the device 1600(1) may determine that at the second time, the first clock would be equal to $T_{2A}=T1+Transit_{Avg}=0+2500=2500$ ms, while the second clock would be equal to $T_{2B}=T2-Skew=3500.5-1000=2500.5$ ms. Therefore, the drift would be equal to $(T_{2B}-T_{2A})/T_{2B}=200$ ppm. Thus, the device 1600(1) may determine that the second clock is 200 ppm faster than the first clock.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method, comprising:
   receiving first data requesting an output;
   determining a function to send content data based at least in part on the first data;
   determining a first state of a first device, the first state indicating that the first device is presenting the content data; and
   associating, based at least in part on the first state, a first device identifier of the first device with second data indicating a set of devices, wherein the content data is to be sent to the set of devices based at least in part on the associating.

2. The computer-implemented method of claim 1, further comprising:
   determining a second state of a second device, the second state indicating that the second device is unassociated with the function and is available to present the content data;
   associating, based at least in part on the second state, a second device identifier of the second device with the second data; and
   causing the second device to present the content data.

3. The computer-implemented method of claim 2, wherein the second device presents the content data synchronously with the first device.

4. The computer-implemented method of claim 2, wherein the content data comprises audio data, the computer-implemented method further comprising:
   receiving third data requesting output of additional content data comprising video data; and
   causing the second device to present the additional content data.

5. The computer-implemented method of claim 2, further comprising:
   determining that the first device is selected as a source device that synchronizes presenting of the content data by the set of devices; and
   sending, to the first device based at least in part on the first data, command data to cause the first device to synchronize the presenting of the content data.

6. The computer-implemented method of claim 2, further comprising:
   determining, based at least in part on the first data, a request to present the content data using the second device instead of the first device;
   based at least in part on the request:
     disassociating the first device identifier from the set of devices; and
     causing the first device to stop presenting the content data while the second device presents the content data.

7. The computer-implemented method of claim 2, further comprising:
   receiving a request to present the content data using a third device;
   based at least in part on the request:
      causing the second device to stop presenting the content data;
      disassociating the second device identifier from the set of devices;
      associating a third device identifier of the third device with the second data indicating; and
      causing the second device to stop presenting the content data.

8. The computer-implemented method of claim 1, further comprising:
   determining, based at least in part on the first data, a request to present the content data using a predefined group of the set of devices, the predefined group comprising the first device and having a group identifier indicated by the second data;
   associating, based at least in part on the first data, the first device identifier of the first device with the predefined group; and
   sending the content data to the predefined group.

9. The computer-implemented method of claim 1, further comprising:
   causing the content data to be presented by a first content player executing on the first device, the first content player associated with a first content application;
   receiving third data requesting the content data to be presented by a second content player executing on the first device, the second content player associated with a second content application;
   determining that the function is supported by the second content application; and
   sending, to a computing component that stores program code of the second content application, fourth data requesting the function to be executed by the first device.

10. The computer-implemented method of claim 1, further comprising:
    determining a second state of the first device, the second state indicating that the first device has stopped presenting the content data;
    determining that the function is to remain in an ongoing state for a period of time;
    determining, after receiving the first data within the period of time, that the function has the ongoing state; and
    causing the first device to present the content data.

11. The computer-implemented method of claim 1, further comprising:
    storing the first device identifier in a data store;
    determining that the first device has stopped presenting the content data; and
    removing the first device identifier from the data store.

12. The method of claim 1, further comprising:
    associating an identifier of the function with the identifier of the set of devices, wherein the content data is to be sent to the set of devices based at least in part on the identifier of the function being associated with the identifier of the set of devices.

13. A system, comprising:
    one or more processors; and
    one or more computer-readable media storing instructions that, upon execution by the one or more processors, configure the system to:
       receive first data requesting an output;
       determine a function to send content data based at least in part on the first data;
       determine a first state of a first device, the first state indicating that the first device is presenting the content data; and
       associate, based at least in part on the first state, a first device identifier of the first device with second data indicating a set of devices, wherein the content data is to be sent to the set of devices based at least in part on the first device identifier being associated with the second data.

14. The system of claim 13, wherein the one or more computer-readable media storing additional instructions that, upon execution by the one or more processors, further configure the system to:
    determine, based at least in part on the first data, a request to present the content data by a second device having a second device identifier;
    determine a permission to present the content data using the second device based at least in part on the second device identifier, the content data, or a state of the second device; and
    associate the second device identifier with the second data based at least in part on the permission.

15. The system of claim 14, wherein the content data is associated with a content type and a content license and the one or more computer-readable media storing additional instructions that, upon execution by the one or more processors, further configure the system to:
    determine that the content license allows presenting the content data on the second device based at least in part on a capability of the second device to present the content type; and
    associate the second device identifier with the second data based at least in part on the content license.

16. The system of claim 14, wherein the content data is associated with an audience suitability rating and the one or more computer-readable media storing additional instructions that, upon execution by the one or more processors, further configure the system to:
    determine a permission to present the content data on the second device based at least in part on the audience suitability rating; and
    associate the second device identifier with an identifier of the set of devices based at least in part on the permission.

17. The system of claim 14, wherein the one or more computer-readable media storing additional instructions that, upon execution by the one or more processors, further configure the system to:
    determine that a state of the second device indicates that no content data is already being presented by the second device;
    change the state of the second device to indicate that the second device is presenting the content data;
    cause the second device to present the content data; and
    associate the second device identifier with the second data.

18. The system of claim 14, wherein the one or more computer-readable media storing additional instructions that, upon execution by the one or more processors, further configure the system to:
    determine a set of candidate devices to present the content data, wherein the set of candidate devices comprises the second device;

determine that the second device is not presenting the content data;
    determine, based at least in part on the first data, a permission to present the content data on the second device;
    cause the second device to present the content data; and
    associate the second device identifier with the second data.

19. The system of claim 14, wherein the content data includes audio data and video data, wherein the first device identifier is associated with the audio data and the second device identifier is associated with the video data, wherein the one or more computer-readable media storing additional instructions that, upon execution by the one or more processors, further configure the system to:
    cause the first device to present the audio data and the second device to present the video data.

20. The system of claim 13, wherein the one or more computer-readable media storing additional instructions that, upon execution by the one or more processors, further configure the system to:
    cause the first device to stop presenting the content data; and
    disassociate the first device identifier from the set of devices.

* * * * *